(12) United States Patent
Carter et al.

(10) Patent No.: US 11,017,664 B2
(45) Date of Patent: May 25, 2021

(54) INTEGRATED TELECOMMUNICATIONS ROADSIDE UNIT

(71) Applicants: AT&T Mobility II LLC, Atlanta, GA (US); AT&T Intellectual Property II, L.P., Atlanta, GA (US)

(72) Inventors: Zachery Carter, Cumming, GA (US); Roger Mahler, Marietta, GA (US); Erie Lai Har Lau, Redmond, WA (US); Sangar Dowlatkhah, Johns Creek, GA (US)

(73) Assignees: AT&T Mobility II LLC, Atlanta, GA (US); AT&T Intellectual Property II, L.P., Atlanta, GA (US)

(*) Notice: Subject to any disclaimer, the term of this patent is extended or adjusted under 35 U.S.C. 154(b) by 193 days.

(21) Appl. No.: 16/145,261

(22) Filed: Sep. 28, 2018

(65) Prior Publication Data

US 2020/0105131 A1 Apr. 2, 2020

(51) Int. Cl.
*G08G 1/01* (2006.01)
*H04W 4/40* (2018.01)
(Continued)

(52) U.S. Cl.
CPC .......... *G08G 1/0116* (2013.01); *G07C 5/008* (2013.01); *H04W 4/40* (2018.02); *H04W 76/14* (2018.02); *H04W 88/16* (2013.01)

(58) Field of Classification Search
CPC ...... G08G 1/0116; H04W 4/40; H04W 88/16; H04W 76/14; H04W 88/04; H04W 40/00; H04W 4/46; G07C 5/008; H04L 67/12
(Continued)

(56) References Cited

U.S. PATENT DOCUMENTS 9,699,154 B2 7/2017 Stojanovski et al.
9,986,476 B2 5/2018 Tenny et al.
(Continued)

FOREIGN PATENT DOCUMENTS

WO WO 2017/030348 2/2017
WO WO 2017/049975 3/2017

OTHER PUBLICATIONS

5G Americas, "V2X Cellular Solutions," 5G Americas, Oct. 2016, http://www.5gamericas.org/en/resources/white-paapers/.
(Continued)

*Primary Examiner* — Jonathan M Dager
*Assistant Examiner* — Jean W Charleston
(74) *Attorney, Agent, or Firm* — Hartman & Citrin LLC

(57) ABSTRACT

Concepts and technologies directed to an integrated telecommunications roadside unit for supporting vehicle-to-everything ("V2X") communications are disclosed herein. Embodiments of an integrated telecommunications roadside unit can include a processor and a memory that store computer-executable instructions that configure a processor to perform operations. The operations can include intercepting a vehicle-to-vehicle communication that is provided from a first vehicle to a second vehicle. The vehicle-to-vehicle communication can be transmitted using a direct transmission mode. The operations can further include encapsulating the vehicle-to-vehicle communication in a user plane package. The operations can also include routing the user plane package to a destination network access node, where the destination network access node is outside of a direct communication range corresponding to the first vehicle and the second vehicle.

20 Claims, 7 Drawing Sheets

(51) Int. Cl.
*H04W 88/16* (2009.01)
*H04W 76/14* (2018.01)
*G07C 5/00* (2006.01)

(58) Field of Classification Search
USPC .......................................................... 701/117
See application file for complete search history.

(56) References Cited

U.S. PATENT DOCUMENTS

| | | | |
|---|---|---|---|
| 2015/0025917 A1* | 1/2015 | Stempora | G06K 9/0061 |
| | | | 705/4 |
| 2015/0170522 A1* | 6/2015 | Noh | G08G 1/096791 |
| | | | 701/117 |
| 2016/0070527 A1* | 3/2016 | Ricci | G06Q 10/06398 |
| | | | 715/716 |
| 2016/0379494 A1* | 12/2016 | Bhuiya | G06Q 10/02 |
| | | | 701/117 |
| 2017/0070923 A1 | 3/2017 | Li et al. | |
| 2017/0272384 A1* | 9/2017 | Lee | H04L 49/252 |
| 2017/0289098 A1* | 10/2017 | Chun | H04L 61/103 |
| 2017/0289935 A1* | 10/2017 | Yoon | G01S 19/13 |
| 2017/0330457 A1* | 11/2017 | Bhalla | G08G 1/096741 |
| 2018/0077668 A1* | 3/2018 | Chun | H04W 76/23 |
| 2018/0103460 A1 | 4/2018 | Sharma et al. | |
| 2018/0132208 A1 | 5/2018 | Pan et al. | |
| 2018/0139593 A1 | 5/2018 | Chun et al. | |
| 2018/0152819 A1 | 5/2018 | Pinheiro et al. | |
| 2019/0141142 A1* | 5/2019 | Filippou | H04W 4/40 |
| 2020/0086746 A1* | 3/2020 | Dudar | B60L 50/10 |
| 2020/0100119 A1* | 3/2020 | Byun | H04B 7/088 |

OTHER PUBLICATIONS

5G Americas, "Cellular V2X Communications Towards 5G," 5G Americas, Mar. 2018, http://www.5gamericas.org/en/resources/white-papers/.

Qualcomm, "Leading the world to 5G: Cellular Vehicle-to-Everything (C-V2X) technologies," Qualcomm Technologies Inc., Jun. 2016.

* cited by examiner

INTEGRATED TELECOMMUNICATIONS ROADSIDE UNIT

BACKGROUND

Historically, communications networks were relegated to providing communicative coupling between communication equipment that was stationary and thus associated with a fixed or otherwise constant geographical location. With the rise of portable user equipment with wireless communication functionality, communicative coupling with a communications network and/or peer devices may occur from a variety of locations. The implementation of communicative coupling into vehicles can facilitate the advancement of autonomous vehicles that customers may use in their daily commutes along roadways, highways, and/or any other thoroughfare. As such, the implementation of vehicle-to-everything ("V2X") communications, which can include vehicle-to-vehicle ("V2V") communications, vehicle-to-infrastructure ("V2I") communications, vehicle-to-network ("V2N") communications, and/or vehicle-to-pedestrian ("V2P") communications, may facilitate communicative coupling between vehicles, infrastructure, a network, and/or pedestrians. However, as more vehicles send communications between each other and/or with the communications network, the communications network may consume additional network resources to accommodate or otherwise support communicative coupling. Conventional techniques to handle the amount of data being sent to and/or from various vehicles using one or more of the V2X communications may affect or otherwise impact end-to-end network latency due to the amount of finite network resources available. As such, the amount of V2X communications generated by vehicles may contribute to network congestion when conventional mechanisms are employed, which in turn can also affect end-to-end network latency.

SUMMARY

The present disclosure is directed to an integrated telecommunications roadside unit for supporting V2X communications, according to various embodiments. According to one aspect of the concepts and technologies disclosed herein, a system is disclosed. In some embodiments, the system can be provided by an integrated telecommunications roadside unit. The system can be communicatively coupled to a network. In some embodiments, the system can include a processor and a memory. The memory can store computer-executable instructions that, in response to execution by the processor, cause the processor to perform operations. In some embodiments, the operations can include intercepting a V2V communication that is provided from a first vehicle to a second vehicle. The operations can also include encapsulating the V2V communication in a user plane package. The operations can also include routing the user plane package to a destination network access node, where the destination network access node is located outside of a direct communication range corresponding to the first vehicle and the second vehicle. The destination network access node can be an integrated telecommunications roadside unit that is configured to receive the user plane package that includes the V2V communication.

In some embodiments, the V2V communication can be provided from the first vehicle to the second vehicle via a vehicle communication interface that uses a direct transmission mode. In some embodiments, the user plane package can be configured to instruct the destination network access node to decapsulate the V2V communication from the user plane package such that the V2V communication remains intact. In some embodiments, the user plane package can be configured to instruct the destination network access node to provide the V2V communication to a third vehicle, which may occur in response to decapsulation of the V2V communication. In some embodiments, the V2V communication is provided to the third vehicle via a vehicle communication interface that uses a direct transmission mode. In some embodiments, the user plane package is configured to instruct the destination network access node to generate a V2X communication, such as a V2N communication, based on the V2V communication. In some embodiments, the user plane package is configured to instruct the destination network access node to provide the V2N communication to one or more user equipment, where the V2N network communication is provided from the destination network access node to the one or more user equipment over a network communication interface that uses a network transmission mode.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to an integrated telecommunications roadside unit for supporting V2X communications to mitigate network congestion, according to various embodiments. As different vehicle technology manufacturers bring products to market, the specific configuration and programming by which the manufacturers instruct vehicles to communicate with each other may vary. Vehicle technology manufacturers may employ varying degrees of technology based on the cost of the vehicle and as such, the amount, frequency, and transmission range with which vehicle communications are provided to and/or from various vehicles may vary. The rise of vehicles transmitting and receiving vehicle communications may lead to network congestion. Moreover, if a vehicle is in a location without communicative service, then vehicle safety features through various vehicle communications may be reduced.

As such, embodiments of the present disclosure provide instances of an integrated telecommunications roadside unit ("ITRU") that can be configured to provide components that enable roadside interaction with vehicles through a direct transmission mode (also may be referred as a direct communication mode), while also including components that enable small cell operations that provide network interaction, such as via communication components that support legacy and New Radio ("NR") standards as understood by one of ordinary skill in the technology. The concepts and technologies discussed herein can enable a mobile network operator and/or a communication service provider to densify vehicle communication service coverage while also providing concepts and technologies that can mitigate network congestion and improve the functioning of network operations. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Figure 1:
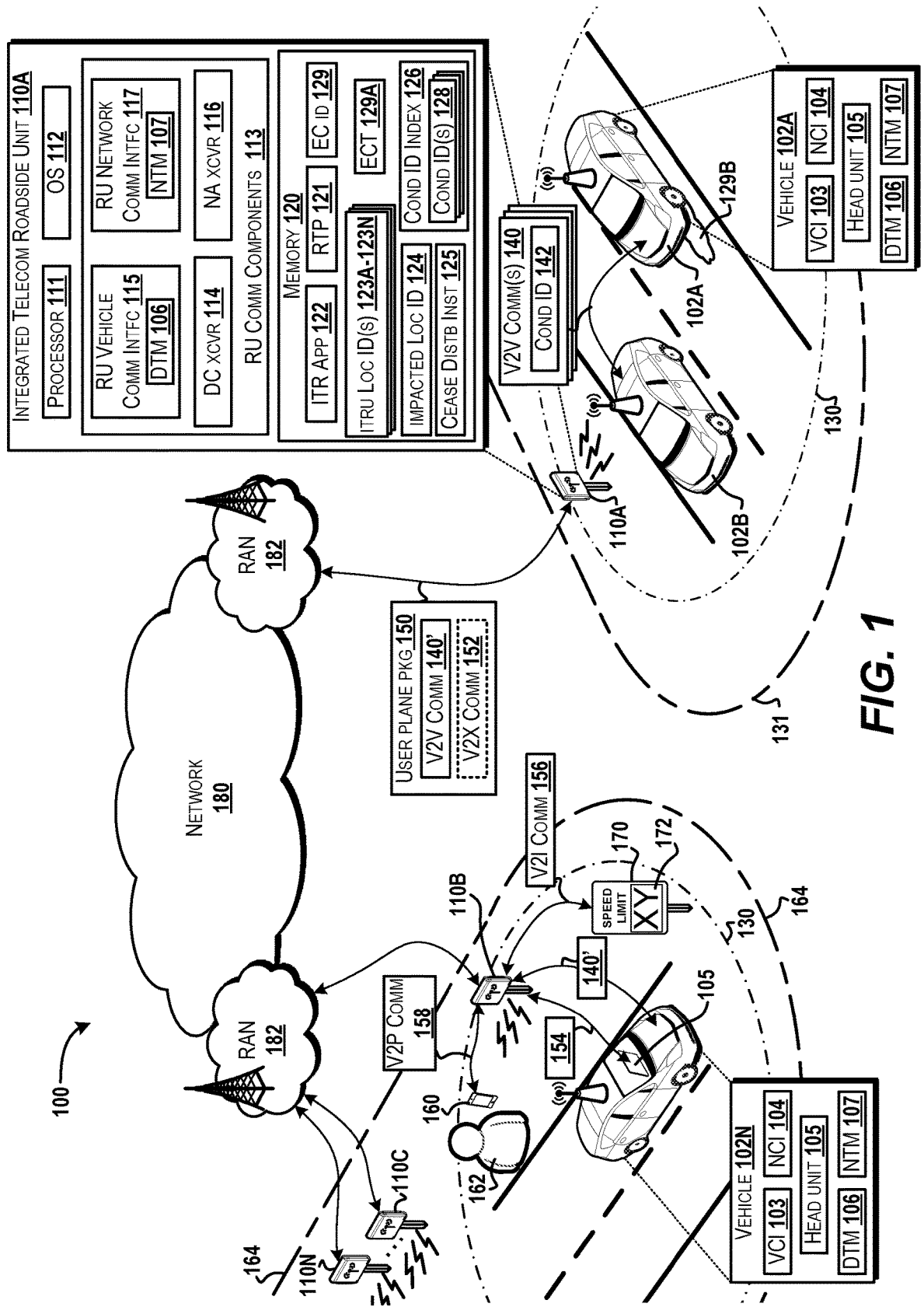
FIG. 1 is a block diagram illustrating an example operating environment for implementing an integrated telecommunications roadside unit, according to an illustrative embodiment.

Referring now to FIG. 1, aspects of an operating environment 100 for implementing various embodiments of the concepts and technologies disclosed herein pertaining to an ITRU will be described, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 includes a plurality of vehicles 102A-102N, a plurality of ITRUs 110A-110N, a user equipment ("UE") 160, one or more instance of a user 162, a connected infrastructure device ("CID") 170, a communications network ("network") 180, and one or more instance of a radio access network ("RAN") 182. The number of instances shown in FIG. 1 is for illustration purposes only and should not be construed as limiting in any way. Therefore, it is understood that zero, one, two, or more instances of each of the components shown in FIG. 1 may be provided in various embodiments.

In the operating environment 100 shown in FIG. 1, the plurality of vehicles 102A-102N are represented as cars driving along a paved roadway, although this may not necessarily be the case for all embodiments. As used herein, the term "vehicle" (e.g., any of the plurality of vehicles 102A-102N) refers to any ground-based vehicle that includes components and/or user equipment capable of sending and/or receiving communications, where the ground-based vehicle is configured to transport, carry, and/or move one or more passengers, cargo, and/or objects. By way of example without limitation, each of the plurality of vehicles 102A-102N can be configured as a car, a truck, a van, a sport utility vehicle, a cross-over vehicle, a motorcycle, a motorized tricycle, a scooter, a go-kart, a golf cart, a forklift, a bus, a semi-trailer truck, a racing vehicle, a snow-capable vehicle, earth-moving equipment, farming/agriculture equipment, combinations thereof, and the like. Although three instances of a vehicle are illustrated in FIG. 1, it is understood that less than three or more than three instances of a vehicle can be included in the plurality of vehicles 102A-102N. It should be understood that the examples provided are for illustration purposes only, and therefore should not be construed as limiting in any way.

In some embodiments, one or more of the plurality of vehicles 102A-102N can be driven, controlled, or otherwise operated by a person. In some embodiments, one or more of the plurality of vehicles 102A-102N may be configured to operate in at least a partially autonomous control mode. In some embodiments, one or more of the plurality of vehicles 102A-102N may be configured to operate as a fully autonomous vehicle. In some embodiments, each of the plurality of vehicles 102A-102N can operate as a "level 3" or "level 4" vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. By way of example, a limited self-driving automation vehicle may be available from WAYMO LLC, a subsidiary of ALPHABET INC., TESLA INC., and/or the VOLVO CARS CORPORATION. It should be understood that the examples provided are for illustration purposes only, and therefore should not be construed as limiting in any way. The NHTSA defines a level 4 vehicle as a fully self-driving automation vehicle that is designed to perform all safety-critical driving functions and monitor roadway conditions for an entire trip to a destination. Such fully self-driving design anticipates that a user will provide destination or navigation input, but the user is not expected to be available for control at any time during the trip. As such, a level 4 vehicle may include both occupied and unoccupied vehicles. The plurality of vehicles 102A-102N can include any combination of the aforementioned vehicle types and can have any combination of capabilities with regard to autonomy. It is understood that the aforementioned discussion of standards defined by the NHTSA are provided for illustration purposes only, and therefore should not be construed as limiting in any way. It is understood that alternate standards, specifications, and/or definitions used to describe levels of autonomous driving modes may be developed and/or adopted by various industry groups and/or companies, such as but not limited to the Society of Automotive Engineers ("SAE") International, the Federal Communications Commission ("FCC"), the Institute of Electrical and Electronics Engineers ("IEEE"), or other industry group. Therefore, it should be understood that the examples provided are for illustration purposes only, and therefore should not be construed as limiting in any way.

As shown in FIG. 1, each vehicle of the plurality of vehicles 102A-102N can include one or more vehicle communication interface 103 and a network communication interface 104 so as to engage in various V2X communications. In various embodiments, the phrase "vehicle-to-everything" (i.e., "V2X") refers collectively to connectivity via one or more message that can be achieved between communication components that can be included in a vehicle and/or one or more of another vehicle (e.g., V2V), nearby connected infrastructure (e.g., V2I), a system or device in a network (e.g., V2N), and a user (referred to as a "pedestrian" or "person") via a user equipment (e.g., V2P). As such, a "communication" that is configured so as to be capable of being sent from a vehicle and/or received by a vehicle may be referred to as a V2X communication, such as a V2X communication 152. In some embodiments, an instance of a V2X communication can be configured based on one or more sending party and/or receiving party involved, and thus an instance of a V2X communication may be configured to take the form of a V2V communication, a V2N communication, a V2I communication, and/or a V2P communication. Therefore, an instance of a V2X communication can include one or more instance of a V2V communication, a V2N communication, a V2I communication, and/or a V2P communication. For example, in some embodiments, the V2X communication 152 can be configured as one or more of a V2V communication 140, a V2V communication 140', a V2N communication 154, a V2I communication 156, and/or a V2P communication 158. Further discussion of these V2X communications will be provided below. It should be understood that the examples provided are for illustration purposes only, and therefore should not be construed as limiting in any way.

In various embodiments, a V2X communication (e.g., any of a V2V communication, a V2N communication, a V2I communication, and/or a V2P communication) can be configured to be sent and/or received via a specific communication interface, such as the vehicle communication interface 103 and the network communication interface 104. Each of the vehicle communication interface 103 and the network communication interface 104 can use and correspond with one or more specific transmission modes (which may, in some embodiments, be referred to as a type of communication mode or V2X communication mode). For example, V2X communications may be transmitted via a direct transmission mode 106 and/or a network transmission mode 107. The direct transmission mode 106 refers to direct communication between one V2X-capable sending device and one or more V2X-capable receiving devices within each other's communication range (e.g., a direct communication range discussed below). Therefore, the direct transmission mode 106 may not require or otherwise rely on network infrastructure (e.g., network access nodes or any connection with the network 180 and/or one or more instance of the RAN 182). In some embodiments, the direct transmission mode 106 can be provided over an 802.11x protocol (e.g., 802.11p or protocol within the 802.11 family of wireless local area network standards), which in some embodiments may be referred to as protocols and/or standards for dedicated short-range communications ("DSRC"). In some embodiments, the direct transmission mode 106 can be provided using specifications pertaining to cellular V2X ("C-V2X"), which is initially defined by the Third Generation Partnership Project ("3GPP") Release 14, discussed in Release 15 and later. In various embodiments, standards and protocols of C-V2X may allow communication components to be configured to support the direct transmission mode 106 (e.g., via a PC5 interface discussed below) and the network transmission mode 107 (e.g., via a Uu interface discussed below). In various embodiments, the vehicle communication interface 103 can be configured to use, support, and provide the direct transmission mode 106, and the network communication interface 104 can be configured to use, support, and provide the network transmission mode 107. In various embodiments, the network transmission mode 107 uses and relies on network infrastructure to transmit V2X communications, and as such the V2X communications may be generated with a configuration to facilitate use of the network transmission mode 107, whereas V2X communications generated with the intent on use with the direct transmission mode 106 are configured to be transmitted directly between devices without being handled by or relying on an intermediate network device (e.g., a network access node).

In some embodiments, the configuration and information included in a V2X communication, along with the type of V2X communication, may be based on the specific transmission mode and communication interface that is used by the device which is generating the V2X communication. For example, the vehicle communication interface 103 can be configured and/or may be designated to send and/or receive V2V communications, V2I communications, and/or V2P communications via the direct transmission mode 106. In an embodiment, the vehicle communication interface 103 can use the direct transmission mode 106 to send and/or receive any V2X communication. The network communication interface 104 of a vehicle (e.g., any of the plurality of vehicles 102A-102N) can be configured and/or may be designated to send and/or receive any type of V2X communication (e.g., any of the V2N communications, V2V communications, V2I communications, and/or V2P communications) via the network transmission mode 107.

The direct transmission mode 106 may be invoked and/or employed by a communication interface that is capable of handling or otherwise engaging in V2X communications, such as the vehicle communication interface 103 that can be included in any of the plurality of vehicles 102A-102N and a roadside unit vehicle communication interface 115 that can be included in any of the plurality of ITRUs 110A-110N. The direct transmission mode 106 refers to a transmission configuration by which a V2X communication (e.g., the V2V communication 140) is generated and configured for transmission directly from one sending device (e.g., the vehicle 102A and/or any of the ITRUs 110A-110N) to one or more receiving devices (e.g., the vehicle 102B, the UE 160, the CID 170, and/or the ITRUs 110A-110N) without the V2X communication being configured to traverse a network (e.g., any of the network 180 and/or one or more instance of the RAN 182), where the one or more receiving devices are located within a direct communication range 130 of the sending device (e.g., the ITRU 110A and the vehicle 102B can represent the receiving devices that are within the direct communication range 130 of the vehicle 102A that represents the sending device). Each communication interface that is configured to engage in and/or use the direct transmission mode 106 (e.g., one or more of the vehicle communication interface 103 and/or the roadside unit vehicle communication interface 115) can be associated with an instance of the direct communication range 130. As such, an instance of the direct communication range 130 corresponds with a maximum distance (e.g., measured in meters) over which an instance of a V2X communication (e.g., the V2V communication 140) can be directly transmitted and/or received using the direct transmission mode 106. Therefore, when two or more V2X capable devices (e.g., any of the vehicles 102A-102N, the ITRUs 110A-110N, the UE 160, and/or the CID 170) are located within the direct communication range 130 of each other, then each V2X capable device may directly send and/or receive V2X communications using the direct transmission mode 106.

By way of example without limitation, the direct communication range 130 can be up to 300 meters in one embodiment, up to 500 meters in another embodiment, or up to 1000 meters in yet another embodiment. In various embodiments, each instance of the direct communication range 130 may have the same or different size based on the specific configuration of the communication interface and components, such as based on one or more of the amount of antennas and/or transceiver configuration for a particular communication interface, a transmission power, a configuration of a transceiver, environmental factors, spectrum availability, power configuration, or other factor that may increase and/or decrease communication distance. It should be understood that the examples provided are for illustration purposes only, and therefore should not be construed as limiting in any way.

In various embodiments, a V2X communication that is transmitted using the direct transmission mode 106 may be provided by a communication interface that is configured as a PC5 interface, where the PC5 interface can support LTE V2X operations corresponding to C-V2X and may be defined in the Third Generation Partnership Project ("3GPP") Release 14 and later. In various embodiments, the vehicle communication interface 103 and the roadside unit vehicle communication interface 115 are configured to be a PC5 interface because the vehicle communication interface 103 and the roadside unit vehicle communication interface 115 may be designated for use with the direct transmission mode 106. In some embodiments, a V2X communication that is transmitted using the direct transmission mode 106 from a PC5 interface may be considered a PC5 communication. In some embodiments, the vehicle communication interface 103 and/or the roadside unit vehicle communication interface 115 that uses the direct transmission mode 106 (e.g., via configuration as a PC5 interface) may limit the type of V2X communications that can be sent and/or received to one or more of V2V communications, V2I communications, and/or V2P communications, but not V2N communications. This can be because, in an embodiment, the V2N communications may be reserved for, and/or exclusively designated to, transmission and communicative coupling via the network transmission mode 107 via a network communication component and/or interface (e.g., via the network communication interface 104 and/or a roadside unit network communication interface 117).

The network transmission mode 107 refers to transmission of a V2X communication that is configured to contact or otherwise communicate with a network (e.g., the network 180 and/or one or more instance of the RAN 182) and/or a network device associated with a network (e.g., any of the ITRUs 110A-110N). In various embodiments, the network transmission mode 107 may be utilized by, and provided by, a communication interface that supports network interaction (e.g., the network communication interface 104 and/or a roadside unit network communication interface 117). A network communication interface using the network transmission mode 107 (the network communication interface 104 and/or the roadside unit network communication interface 117) can be configured to transmit and/or receive V2X communications (e.g., a V2N communication) so as to be directed and/or provided to a destination receiving device within and/or associated the network (e.g., the network 180 and/or one or more instance of the RAN 182). As such, V2X communications that are initially generated by the sending device and transmitted via the network transmission mode 107 may rely on transmission via the network 180 and/or a device configured to provide network access (e.g., any of the ITRUs 110A-110N). A V2X communication transmitted using the network transmission mode 107 may be intended or otherwise directed to a destination or target receiving device (e.g., any of the ITRUs 110B-110N that are configured as a destination network access node) that is located outside of an instance of the direct communication range 130 corresponding to a device from which the V2X communication was generated, originated, and/or was initiated. For example, an instance of a V2V communication (e.g., a V2V communication 140) may be configured (upon generation by the vehicle 102A) to be sent only within an instance of the direct communication range 130 for the vehicle 102A, the vehicle 102B, and/or the ITRU 110A, and not outside of this same instance of the direct communication range 130 (for at least the vehicle 102A) because the V2V communication 140 sent from the vehicle 102A using the direct transmission mode 106 may lack destination contact information of a receiving device (e.g., any of the vehicle 102B, the vehicle 102N, and any of the ITRUs 110A-110N which can be a destination network node). Therefore, in various embodiments, any of the ITRUs 110A-110N can support, send, and receive V2X communications that correspond with and/or are provided using the network transmission mode 107 so as to provide routing, relaying, and traversal to a receiving device that is located outside of an instance of the direct communication range 130 from which the particular V2X communication was generated (and thus beyond reception using the direct transmission mode 106). For example, if the vehicle 102A were to generate a V2N communication (not shown) that is configured to be sent using the network transmission mode 107 to a server within the network 180, then the vehicle 102A may configure the V2N communication with destination contact information for the server and activate the network communication interface 104 to provide the V2N communication to the ITRU 110A using the network transmission mode 107. An instance of a V2X communication that transmits via the network transmission mode 107 can include destination contact information (e.g., an Internet Protocol "IP" Address, an application identifier, device identifier, or some other network address) pertaining to the targeted device, application, or service so that the network 180 and/or a device configured to provide and/or facilitate network access (e.g., any of the ITRUs 110A-110N) can use the destination contact information already within the V2X communication to relay and route the V2X communication to the targeted recipient. As such, in some embodiments, use of the network transmission mode 107 can cause a sending device (e.g., any of the plurality of vehicles 102A and/or the ITRUs 110A-110N) to configure a V2X message so as to be sent as a unicast message that indicates a targeted recipient by including destination contact information of the targeted recipient. Comparatively, a V2V communication (e.g., the V2V communication 140) may be initially generated (e.g., by the vehicle 102A) without destination contact information and thus the V2V communication 140 may have been initially configured to be broadcast only within the direct communication range 130 of the vehicle 102A using the direct transmission mode 106 and thus may not be initially configured to be sent as a unicast message using the network transmission mode 107 to a network access point, such as the ITRU 110A, due to the lack of destination contact information. In some embodiments, network communication interfaces that are configured to support and use the network transmission mode 107 (e.g., the network communication interface 104 and the roadside unit network communication interface 117) may be configured to provide and support a Uu interface, which may be provided by communication components that conform or otherwise support C-V2X standards and/or specifications, such as shown with respect to FIG. 1 and FIG. 2. The network communication interfaces that are configured to support and use the network transmission mode 107 (e.g., the network communication interface 104 and the roadside unit network communication interface 117) provide an over-the-air wireless interface that can transmit V2X communications outside of the direct communication range 130 and can be configured to access a network (e.g., the RAN 182 and/or the network 180) via a network access node (which may also be referred to as a network access point), such as any of the plurality of ITRUs 110A-110N. In various embodiments, an instance of a communications interface that can support and use the network transmission mode 107 (e.g., the network communication interface 104 and the roadside unit network communication interface 117) may conform to one or more specifications, regulations, definitions, protocols, or other operating parameters associated with one or more of LTE, LTE Advanced, LTE Advanced Pro, 5G New Radio, a combination thereof, or any future wireless network connection that enables communicative coupling beyond the direct communication range 130).

In some embodiments, an instance of a vehicle (e.g., any of the plurality of vehicles 102A-102N) can include a vehicle head unit ("head unit") 105. The head unit 105 can include one or more instances of a display for presenting a user interface that can provide visual images. The head unit 105 also can include (and/or be communicatively coupled to) input and output components that provide audio output and receive input from a user, such as via one or more speakers and/or microphones. In some embodiments, the head unit 105 can be configured to include a heads up display, a vehicle information display, a console display, blind spot alert mechanisms, a combination thereof, or any other audio, visual, and/or haptic feedback mechanism that can communicate or convey information to a user associated with a receiving device (e.g., any of the plurality of vehicles 102A-102N, the ITRUs 110A-110N, the UE 160, and/or the CID 170). In some embodiments, one or more instances of information included within a V2X communication (e.g., any of the V2V communication 140, the V2P communication 158, the V2I communication 156, and/or the V2N communication 154) can be presented to a user through visual presentation and/or audio presentation via one or more instance of a head unit 105. It should be understood that the examples provided are for illustration purposes only, and therefore should not be construed as limiting in any way.

The operating environment 100 can include a plurality of ITRUs 110A-110N that can be associated with a communication service provider. In some embodiments, the communication service provider can be associated with and/or otherwise support and host a network that can support V2X services, such as the network 180 and/or one or more instances of the RAN 182. The communication service provider can be a mobile network operator, a roadside unit operator, a network service host, or any other provider of communicative services that can support and/or interact with V2X communications (e.g., any of the V2V communication 140, the V2N communication 154, the V2I communication 156, and the V2P communication 158). In various embodiments, an instance of an integrated telecommunication roadside unit (e.g., any of the ITRUs 110A-110N) can include a physical housing body that can hold, retain, or otherwise provide a physical support structure for one or more hardware components discussed herein. Each instance of the ITRUs 110A-110N can be configured to support and facilitate communicative interactions with any V2X communication, while also providing and serving as an access point to the network 180 (and/or to an instance of the RAN 182) by being configured as a network access node (which may also be referred to as a network access point). For clarity, a discussion of the ITRU 110A will be provided for illustration purposes of an embodiment of an integrated telecommunication roadside unit. It is understood that any of the ITRUs 110A-110N can be configured as the ITRU 110A. It should be understood that the examples provided are for illustration purposes only, and therefore should not be construed as limiting in any way.

In various embodiments, the ITRU 110A can include one or more instance of a processing unit and/or processing circuitry, such as one or more instance of a processor 111. The processor 111 can include one or more central processing units ("CPUs") configured with one or more processing cores. The processor 111 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processor 111 can include one or more discrete GPUs. In some other embodiments, the processor 111 can include CPU and GPU components that are configured in accordance with a co-processing CPU/GPU computing model, wherein the sequential part of an application executes on the CPU and the computationally-intensive part is accelerated by the GPU. The processor 111 can include one or more system-on-chip ("SoC") components along with one or more other components illustrated as being part of roadside unit communication components 113, including, for example, a memory 120, a direct communication transceiver 114, a network access transceiver 116, the roadside unit vehicle communication interface 115, the roadside unit network communication interface 117, or some combination thereof. In some embodiments, the processor 111 can be or can include one or more SNAPDRAGON SoCs, a cellular V2X ("C-V2X") chipset, and/or another architecture available from QUALCOMM of San Diego, Calif.; one or more TEGRA SoCs and/or another architecture available from NVIDIA of Santa Clara, Calif.; one or more HUMMINGBIRD SoCs and/or another architecture available from SAMSUNG of Seoul, South Korea; one or more Open Multimedia Application Platform ("OMAP") SoCs and/or another architecture available from TEXAS INSTRUMENTS of Dallas, Tex.; one or more customized versions of any of the above SoCs; and/or one or more proprietary SoCs and/or proprietary circuitry capable of supporting V2X communication processing. The processor 111 can be or can include one or more hardware components architected in accordance with an ARM architecture, available for license from ARM HOLDINGS of Cambridge, United Kingdom. Alternatively (or additionally), the processor 111 can be or can include one or more hardware components architected in accordance with an x86 architecture, such as an architecture available from INTEL CORPORATION of Mountain View, Calif., and others. Those skilled in the technology will appreciate that the implementation of the processor 111 can utilize various computation architectures, and as such, the processor 111 should not be construed as being limited to any particular computation architecture or combination of computation architectures, including those explicitly disclosed herein.

In various embodiments, the ITRU 110A can include and execute an instance of an operating system 112 to support execution and configuration of one or more operations and functions discussed herein. In some embodiments, the operating system 112 can include, by way of example without limitation, a member of the SYMBIAN OS family of operating systems from SYMBIAN LIMITED; a member of the WINDOWS OS, WINDOWS MOBILE OS, and/or WINDOWS PHONE OS families of operating systems from MICROSOFT CORPORATION; a member of the PALM WEBOS family of operating systems from HEWLETT PACKARD CORPORATION; a member of the BLACKBERRY OS family of operating systems from RESEARCH IN MOTION LIMITED; a member of the IOS family of operating systems or a member of the OS X family of operating systems from APPLE INC.; a member of the ANDROID OS family of operating systems from GOOGLE INC.; an open-source software operating system build around the LINUX kernel; a member of a real-time operating system; a member of a portable operating system interface automotive open system architecture and/or other operating systems. These operating systems are merely illustrative of some contemplated operating systems that may be used in accordance with various embodiments of the concepts and technologies described herein and therefore should not be construed as being limiting in any way.

As discussed above, each instance of an ITRU (e.g., any of the ITRUs 110A-110N) can include hardware and software communication components that facilitate the transmission, reception, and any other communicative coupling via the direct transmission mode 106 and the network transmission mode 107, such as by each ITRU including one or more instances of roadside unit communication components ("RUCC") 113. By this, each instance of an ITRU (e.g., any of the ITRUs 110A-110N) can be configured to provide V2X services as a roadside unit device through direct transmission mode 106, while also being configured as a network access point (also referred to as network access node) that provides and enables access to the network 180 and/or an instance of the RAN 182. For example, in some embodiments, an instance of the RUCC 113 can include a direct communication transceiver, such as the direct communication transceiver 114, that supports and/or hosts the roadside unit vehicle communication interface 115 to provide communicative coupling and transmissions via the direct transmission mode 106. The direct communication transceiver 114 can include hardware resources (e.g., sensors, antennas, receivers, etc.), software modules, and/or firmware to support the direct transmission mode 106, such as resources that provide implementation of DSRC via wireless local area network specifications (e.g., 802.11x) and/or implementation of PC5 via communication components that provide C-V2X direct communications via configuration of the roadside unit vehicle communication interface 115 as a PC5 interface. In various embodiments, the direct communication transceiver 114 can include one or more antenna, receiver, transmitter, controller, and any other circuitry so as to host, support, provide, and/or facilitate the roadside unit vehicle communication interface 115 so as to engage in the direct transmission mode 106. It is understood that the direct transmission mode 106 and the network transmission mode 107 pertain to different wireless communication modes, as discussed herein.

In some embodiments, each instance of an ITRU (e.g., any of the ITRUs 110A-110N) may provide V2X communication services as a "small cell" based on each of the ITRUs 110A-110N being configured to interact with V2X communications transmitted using the direct transmission mode 106 from within the direct communication range 130. As such, it is understood that the phrase "small cell" refers to the V2X communicative service area by which an instance of an ITRU (e.g., any of the ITRUs 110A-110N) can engage in V2X communications using the direct transmission mode 106, and therefore an instance of an ITRU may be considered to provide V2X communication services as a "small cell" within an instance of the direct communication range 130.

In various embodiments, each instance of an ITRU (e.g., any of the ITRUs 110A-110N) can be configured as a network access node which serves as an access point to a network (e.g., the network 180 and/or an instance of the RAN 182) and can support V2X communications via the network transmission mode 107. An instance of an ITRU (e.g., any of the ITRUs 110A-110N) can include a network access transceiver, such as the network access transceiver 116, that supports, hosts, and provides hardware resources, software, and/or firmware to operate the roadside unit network communication interface 117 that provides and allows for V2X communications using the network transmission mode 107. In various embodiments, one or more instance of the network access transceiver 116 and/or the roadside unit network communication interface 117 can be configured as one or more of a base station, a NodeB, an evolved Node B ("eNB"), a next generation Node B ("gNB") that support 5G NR, a combination thereof, or another network radio interface that supports communicative coupling that reaches beyond the direct communication range 130 so as to support the network transmission mode 107.

In some embodiments, the network access transceiver 116 and the roadside unit network communication interface 117 can enable an instance of an ITRU (e.g., any of the ITRUs 110A-110N) to handle, initiate, receive, relay, route, or otherwise engage in communications between an ITRU and one or more devices within and/or communicatively coupled with the network 180 and/or one or more instance of the RAN 182. Each instance of an ITRU (e.g., any of the ITRUs 110A-110N) can be associated with, correspond with, and/or otherwise communicatively couple with an instance of the RAN 182. In some embodiments, an ITRU (e.g., any of the ITRUs 110A-110N) provides an access point to an instance of the RAN 182, and therefore one or more instances of an ITRU represent or otherwise correspond with a network access node of the RAN 182. For example, in an embodiment of the operating environment 100, each of the ITRUs 110A-110N communicatively couple to an instance of the RAN 182, and therefore each of the ITRUs 110A-110N serves as a network access node associated with at least one instance of the RAN 182. In some embodiments, one or more network access nodes (i.e., instances of an ITRU) may be referred to or otherwise represent a destination network access node. For example, if the ITRU 110A generates a message and/or package (e.g., a user plane package 150 discussed below) that is intended, directed, and/or addressed to any of the ITRU 110B, the ITRU 110C, and/or the ITRU 110N, then each ITRU to which the message and/or package is directed (e.g., any of the ITRUs 110B-110N) would correspond with (and thus represent) a destination network access node. It should be understood that the examples provided are for illustration purposes only, and therefore should not be construed as limiting in any way.

In various embodiments, an instance of an ITRU (e.g., any of the ITRUs 110A-110N) can include a data storage device, such as the memory 120. In some embodiments, the memory 120 can include volatile and/or non-volatile memory implemented in any method or technology for storage of information such as computer-executable instructions, data structures, software program modules, or other data disclosed herein. It is understood that, use of the term "memory" and "computer storage medium" and variations thereof in the claims does not include, and shall not be construed to include, a wave or a signal per se and/or communication media. The memory 120 can include a computer storage device that is configured substantially similar to memory discussed further below with respect to FIG. 6. In various embodiments, the memory 120 can include and store one or more instance of an integrated telecommunication roadside ("ITR") application 122, a plurality of ITRU location identifiers 123A-123N, an impacted location identifier 124, a cease distribution instruction 125, a condition identifier index 126 that has one or more instances of a condition identifier 128, an indication of a retention time period 121, an extant condition identifier 129 associated with an extant condition location 131, and an extant condition threshold 129A. In various embodiments, the ITR application 122 can be executed by an instance of an ITRU (e.g., any of the ITRUs 110A-110N) to configure an instance of the processor 111 and/or the RUCC 113 to perform one or more operations and functions discussed herein. It should be understood that the examples provided are for illustration purposes only, and therefore should not be construed as limiting in any way.

The operating environment 100 can include the network 180 and one or more instance of the RAN 182. In various embodiments, the network 180 can include one or more of a radio access network (e.g., an instance of the RAN 182), an evolved packet core network, a core network, an IP-based network, a transport network, an optical transport network, a circuit switched network, a mobile Wide Area Network, a combination thereof, or the like. It is understood that the network 180 can communicate with one or more computing systems and/or devices (e.g., any of the plurality of vehicles 102A-102N, the UE 160, the CID 170) via one or more network access points (e.g., via one or more ITRUs 110A-110N using the network transmission mode 107 provided by an instance of the roadside unit network communication interface 117) that can establish, provide, and maintain wireless and/or wired communication links. It is understood that, in some embodiments, one or more instances of a network access point may provide wired and/or wireless communicative coupling to any component of the operating environment 100. In various embodiments, the network 180 may be accessed via one or more instance of the RAN 182. An instance of the RAN 182 can include, but should not be limited to, one or more of a base transceiver station, a wireless router, a femtocell, an Node B, an eNodeB, a gNodeB (i.e., an access point that incorporates New Radio access technology, such as LTE Advanced, and other 5G technology), a multi-standard metro cell node, an optical network terminal, and/or other network nodes or combinations thereof that are capable of providing communication to and/or from the network 180. In some embodiments, the network 180 and/or an instance of the RAN 182 can include and support one or more of an evolved universal mobile telecommunications system ("UMTS"), a terrestrial radio access ("E-UTRAN"), a mobility management entity ("MME"), a serving/PDN gateway ("S/PGW"), a home subscriber server ("HSS"), an access and mobility function ("AMF"), a session management function-user plane function ("SMF-UPF"), unified data management ("UDM"), a V2X application server, an application function ("AF"), an enhanced mobile broadband system ("eMBBS"), a mobile edge computing ("MEC") unit, a combination thereof, and/or any other systems, devices, and/or functions that may be included in 3G, 4G, 5G, or later architecture. It should be understood that the examples provided are for illustration purposes only, and therefore should not be construed as limiting in any way.

The operating environment 100 can include one or more instance of a user equipment, such as the UE 160, that can be configured as a V2X-capable device that can receive and transmit V2X communications so as to interact with any of the plurality of vehicles 102A-102N, the ITRUs 110A-110N, the CID 170, and/or other instances of user equipment. An instance of a UE can be associated with a user, such as the CID 170 that is associated with the user 162. The user 162 may be considered to be a pedestrian that can interact with the UE 160 so as to be presented with audio and/or visual output based on one or more V2X communication to the UE 160, such as the V2P communication 158. In various embodiments, the UE 160 can include a display, a processor, and a memory, communication components that are configured to be V2X-capable and interact with V2X communications through the direct transmission mode 106 and/or the network transmission mode 107. Embodiments of a CID (e.g., the CID 170) can include, but should not be limited to, a mobile communications device, a desktop computer, a laptop computer, a tablet, a smart wearable device (e.g., smart-glasses, a smart watch, a fitness device), a smart home appliance (e.g., a smart refrigerator, a smart thermostat, a smart picture frame), a smart television, a smart dongle, a bicycle computer system, a vehicle head unit, in-transit entertainment device, and/or any other computing systems that can send and/or receive data (e.g., a V2X communication) for interaction with other V2X devices. The UE 160 can include one or more communication interfaces by which to communicatively couple with V2X capable devices, and therefore may include communications components and communications interfaces that are configured at least similar to one or more of the vehicle communication interface 103 and/or the network communication interface 104. The UE 160 can include one or more transceiver that enables communicative coupling with the network 180 and/or an instance of the RAN 182, such as via one or more ITRUs 110A-110N. In some embodiments, the UE 160 can include a display that provides audio output and/or visual output based on V2X communications that are sent and/or received. It is understood that the UE 160 can be configured substantially similar to, and thus include one or more components of, an embodiment of a UE discussed with respect to FIG. 7. Further discussion of an embodiment of a UE capable of implementing aspects of the operating environment 100 is provided below with respect to FIG. 7. It is understood that zero, one, or more than one instance of the UE 160 can be present within various embodiments of the operating environment 100. It should be understood that the examples provided are for illustration purposes only, and therefore should not be construed as limiting in any way.

The operating environment 100 can include one or more instance of a connected infrastructure device, such as the CID 170. The phrase "connected infrastructure device" refers to any device and/or system that is configured as a V2X-capable device that is associated with supporting, maintaining, managing, and/or interacting with activities of plurality of vehicles 102A-102N, and is configured to receive and/or transmit V2X communications so as to interact with any of the plurality of vehicles 102A-102N, the ITRUs 110A-110N, the CID 170, and/or other instances of connected infrastructure devices. In various embodiments, the UE 160 can include one or more of a display, a processor, a memory, and communication components that are configured to be V2X-capable and interact with V2X communications through the direct transmission mode 106 and/or the network transmission mode 107. Embodiments of a UE (e.g., the UE 160) can include, but should not be limited to, a traffic control device, a road traffic alert display, speed limit indication device, pedestrian crossing device, a tollway traffic device, a movable roadway barrier device, lighting devices, and/or any other roadside infrastructure that can facilitate and/or support vehicle travel and movement via V2X communications. It is understood that use of the term "roadway" and variations thereof (e.g., roadside) should not be limited to being associated with a specific paved surface, but instead is intended to refer to any ground surface (e.g., paved, unpaved, partially paved, raised, covered, etc.) that can be used, at various points in time, by one or more V2X-capable devices (e.g., by any of the plurality of vehicles 102A-102N). In various embodiments, an instance of the CID 170 can include communication components that are at least similar to the vehicle communication interface 103, the network communication interface 104, and/or other communication components discussed herein to provide, support, and/or engage in the direct transmission mode 106 and/or the network transmission mode 107. In the embodiment of the operating environment 100 shown in FIG. 1, the CID 170 is configured as a speed limit indication device that can include a display 172. In some embodiments, an instance of a V2X communication (e.g., the V2I communication 156) can cause the CID 170 to alter the display 172, such as by reconfiguring a speed limit value presented on the display 172. It should be understood that the examples provided are for illustration purposes only, and therefore should not be construed as limiting in any way.

In various embodiments, one or more of the plurality of vehicles 102A-102N can be configured to detect and identify an instance of a travel condition, such as but not limited to a roadway condition (e.g., ice formation, loose gravel causing wheel slippage, a foreign object on the roadway, etc.), changes in traffic (e.g., vehicles slowing ahead, traffic accident, etc.), actions of other vehicles, infrastructure, and/or pedestrians (e.g., vehicle in blind spot, pedestrian in walkway, etc.), vehicle behavior and functions (e.g., application of anti-lock brakes evasive maneuvers, rapid deceleration, traction control indicating wheel slippage, etc.), weather conditions, or any other condition that may be applicable to and/or experienced by a V2X device (e.g., any of the plurality of vehicles 102A-102N). Each travel condition may be identified by and/or associated and/or correspond with at least one of a plurality of condition identifiers 128. In some embodiments, the plurality of condition identifiers 128 can be stored in the condition identifier index 126, which an instance of the ITR application 122 can reference so as to search and identify a travel condition corresponding to one or more of the plurality of condition identifiers 128.

In some embodiments, a travel condition which can affect an operation, behavior, presentation, and/or function of another V2X device, and/or should be made known to another V2X device, can be referred to as an extant condition 129B. For example, in the operating environment 100 shown in FIG. 1, an instance of the extant condition 129B can correspond with a travel condition causing a roadway hazard (e.g., ice formation, an oil slick, etc.). In some embodiments, each of the plurality of vehicles 102A-102N may be configured to detect a vehicle condition experienced by the vehicle based on an output from a vehicle sensor, a vehicle camera, an engine control unit, an engine function, and/or other input or output from within and/or outside of the vehicle. For example, the extant condition 129B on the roadway may cause one or more wheels of the vehicle 102A to slip, such as due to the extant condition 129B being an ice formation or oil slick on a roadway. The vehicle 102A may be configured to detect the wheel slippage because a traction control system of the vehicle 102A is activated, which in turn causes the vehicle 102A to determine a condition identifier based on the vehicle condition, such as a condition identifier 142 that may, in an embodiment, indicate traction control activation of the vehicle 102A. In some embodiments, each of the vehicles 102A-102N may include an instance of the condition identifier index 126 that retains the plurality of condition identifiers 128 from which the condition identifier 142 is determined. Therefore, in some embodiments, when a vehicle (e.g., the vehicle 102A) detects a vehicle condition and determines the corresponding condition identifier (e.g., the condition identifier 142), then the vehicle 102A may be configured to generate an instance of the V2V communication 140 that includes the condition identifier 142 to inform surrounding vehicles. The vehicle 102A can be configured to broadcast and/or transmit the V2V communication 140 via the vehicle communication interface 103 using the direct transmission mode 106 to another vehicle (e.g., the vehicle 102B) so as to inform the vehicle 102B of the condition identifier 142 (which may indicate activation of traction control). Because the vehicle 102B and the vehicle 102A are within the direct communication range 130 of each other, the vehicle 102B can receive the V2V communication 140 that is transmitted using the direct transmission mode 106. It should be understood that the examples provided are for illustration purposes only, and therefore should not be construed as limiting in any way.

In some embodiments, the V2V communication 140 may be configured without a destination contact identifier corresponding to the vehicle 102B that is in the direct communication range 130 of the vehicle 102A. For example, in some embodiments, the V2V communication 140 may be broadcast and/or transmitted from the vehicle 102A using the direct transmission mode 106 such that any V2X device capable of receiving the V2V communication 140 may obtain the V2V communication 140. However, it is understood that this may not necessarily be the case. In some embodiments, a handshake or exchange of device identities may occur between V2X-capable devices that are within the direct communication range 130 of each other so that each device has a destination contact identifier for each of the other devices. Irrespective of whether the V2V communication 140 identifies the vehicle 102B, the vehicle 102B may receive the condition identifier 142 from the V2V communication 140 based on the V2V communication 140 being provided via the direct transmission mode 106. In some embodiments, the vehicle 102B may not necessarily know what caused the vehicle 102A to activate the traction control system that triggered the generation of the condition identifier 142, but rather the vehicle 102B may use the V2V communication 140 (and/or the condition identifier 142 included therein) to assess and/or configure the operation of the vehicle 102B. It should be understood that the examples provided are for illustration purposes only, and therefore should not be construed as limiting in any way.

In various embodiments, an instance of an ITRU (e.g., the ITRU 110A) may be located within the direct communication range 130 of one or more of the plurality of vehicles 102A-102N. For example, in the operating environment 100 shown in FIG. 1, the ITRU 110A is located within the direct communication range 130 corresponding to the vehicle 102A and the vehicle 102B. The ITR application 122 can be configured to scan and/or monitor an instance of the direct communication range 130 from which the ITRU 110A can transmit and/or obtain V2X communications using the direct transmission mode 106. In an embodiment, when the vehicle 102A and the vehicle 102B are within direct communication proximity of the ITRU 110A (i.e., when the direct communication range 130 for each of the vehicle 102A, the vehicle 102B, and the ITRU 110A overlap), the ITR application 122 may detect that one or more instance of V2V communications (e.g., the V2V communication 140) are being transmitted and/or broadcast from the vehicle 102A via the vehicle communication interface 103 using the direct transmission mode 106. As such, the ITR application 122 may detect a plurality of V2V communications being sent between vehicles within the direct communication range 130.

In some embodiments, the ITR application 122 can intercept or otherwise obtain an instance of the V2V communication 140 that is transmitted or otherwise provided from the vehicle 102A to the vehicle 102B. In some embodiments, because the vehicle 102A is broadcasting the V2V communication 140 from the vehicle communication interface 103 using the direct transmission mode 106, the ITR application 122 intercepting or otherwise obtaining the V2V communication 140 may not affect or impede the vehicle 102B from receiving an instance of the V2V communication 140. In addition to the ITRU 110A being configured as a network access node that provides network access functionality via the roadside unit network communication interface 117 to support the network transmission mode 107, the ITRU 110A can receive the V2V communication 140 via the roadside unit vehicle communication interface 115 that uses the direct transmission mode 106.

In some embodiments, the ITR application 122 can extract the condition identifier 142 from the V2V communication 140. In some embodiments, the condition identifier 142 can indicate a value that represents the particular condition experienced by the sending vehicle (e.g., the vehicle 102A). For example, in an embodiment, the condition identifier 142 may indicate the value "15" to indicate traction control activation. The ITR application 122 may access the condition identifier index 126 to determine the travel condition associated with and/or indicated by the condition identifier 142. For example, in some embodiments, the condition identifier index 126 may indicate that the condition identifier 142 having a value of "15" (associated with traction control activation) may indicate that the traction control activation from wheel slippage may be caused by a roadway hazard that represents an extant condition. Specifically, when the ITR application 122 compares the condition identifier 142 with the condition identifier index 126, the condition identifier index 126 may indicate that the condition identifier 142 points to the extant condition identifier 129 so as to indicate that an extant condition may exist within the direct communication range 130 of the ITRU 110A. The location of each of the ITRUs 110A-110N may be provided by the ITRU location identifiers 123A-123N, respectively (which may indicate geolocation coordinates, an IP address, mile markers of a roadway, or other location information). In some embodiments, one or more of the ITRU location identifiers 123A-123N may be used to indicate an extant condition location 131 corresponding with the extant condition 129B. When the condition identifier index 126 indicates that a particular one or more of the plurality of condition identifiers 128 point to the extant condition identifier 129, then the ITR application 122 may determine that a hazardous travel condition may exist, such as the extant condition 129B. In some embodiments, if the condition identifier 142 is determined to point to the extant condition identifier 129 so as to indicate a hazardous condition (e.g., the extant condition 129B), then the ITR application 122 may be triggered to inform one or more V2X-capable devices (that is beyond or otherwise located outside of the direct communication range 130 corresponding with the ITRU 110A) of the extant condition 129B at the extant condition location 131.

In some embodiments, to inform one or more V2X-capable devices located outside of the direct communication range 130 of the condition identifier 142 included in the V2V communication 140 provided from the vehicle 102A, the ITR application 122 can generate an instance of the user plane package 150. The user plane package 150 can be configured to be sent from the ITRU 110A via the network access transceiver 116 that can communicatively couple the ITRU 110A to an instance of the RAN 182 and/or the network 180. In some embodiments, the ITRU 110A can operate as an eNB and/or a gNB within an instance of the RAN 182, and therefore the ITR application 122 can be in communication with one or more of a mobile edge client ("MEC") and/or a serving gateway ("S-GW") of the RAN 182 and/or the network 180. In some embodiments, the user plane package 150 can be configured so as to allow an instance of an MEC to contact the S-GW, which in turn can contact a packet data network gateway ("P-GW") and/or function to route the user plane package 150 through the network 180 and to one or more instances of a destination network access node (e.g., any of the ITRUs 110B-110N).

When the ITR application 122 intercepts, obtains, or otherwise receives the V2V communication 140, the ITR application 122 can determine that the V2V communication 140 was transmitted via the direct transmission mode 106 because the V2V communication 140 is not in a format configured for network access. For example, in some embodiments, the ITR application 122 can determine that the V2V communication 140 does not correspond with the network communication interface 104 and/or the roadside unit network communication interface 117 (e.g., a Uu interface) that uses the network transmission mode 107, but instead the V2V communication 140 is configured for direct transmission mode 106 due to conformance with the vehicle communication interface 103 and/or the roadside unit vehicle communication interface (e.g., a PC5 interface). Therefore, conventional roadside units may discard or reject V2V communications that do not conform to the network transmission mode 107 (and thus also do not correspond with either of the network communication interface 104 and the roadside unit network communication interface 117) from being routed through the RAN 182 and/or the network 180. However, embodiments of the present disclosure provide one or more instances of the ITRUs 110A-110N that can reconfigure and enable the V2V communication 140 to be provided outside of the direct communication range 130 despite the V2V communication 140 not identifying another V2X device that is a target recipient (e.g., another vehicle or V2X device) outside of the direct communication range 130.

In various embodiments, the ITR application 122 can generate the user plane package 150 so as to have a configuration that conforms with a network access protocol of the RAN 182 and/or the network 180, such as but not limited to, a general packet radio services tunneling protocol ("GTP") that can be used on an Si interface between an ITRU (e.g., any of the ITRUs 110A-110N) and the RAN 182 (e.g., an S-GW of the RAN 182). In various embodiments, the ITR application 122 may encapsulate the V2V communication 140 within the user plane package 150, which is represented in the FIG. 1 as a V2V communication 140'. In FIG. 1, the V2V communication 140' is shown as a separate instance from the V2V communication 140 for clarity purposes only. It is understood that the V2V communication 140 that is received by the ITR application 122 may be used in the user plane package 150 and/or a copy of the V2V communication 140 may be used, either of which may be represented by the V2V communication 140'. Therefore, the V2V communication 140' can be considered substantially similar to the V2V communication 140, and therefore the V2V communication 140' may retain the configuration and information provided by the vehicle 102A. For example, the V2V communication 140' may retain a configuration that enables transmission via a communication interface that supports the direct transmission mode 106 (e.g., a PC5 interface that is provided by any of the roadside unit vehicle communication interface 115 and the vehicle communication interface 103). Specifically, the user plane package 150 can be configured and/or formatted to be provided via the network access transceiver 116 that can connect with the RAN 182 on a user plane (e.g., via the network access transceiver 116 supporting routing of the user plane package 150 using an Si interface). As such, the user plane package 150 can enable a destination network access node (e.g., any of the ITRUs 110B-110N) to receive an intact instance of the V2V communication 140' (i.e., without modification to the V2V communication 140') despite the destination network access nodes (e.g., any of the ITRUs 110B-110N) being outside of the direct communication range 130 of the ITRU 110A, the vehicle 102A, and the vehicle 102B. In some embodiments, the user plane package 150 may be sent as one or more encapsulated packets in a core network of the RAN 182 and/or the network 180. It should be understood that the examples provided are for illustration purposes only, and therefore should not be construed as limiting in any way.

In some embodiments, the ITR application 122 may determine whether a trigger has occurred so as to cause the generation and/or routing of the user plane package 150 to a destination network access node (e.g., any of the ITRUs 110B-110N). For example, in some embodiments, the ITR application 122 may determine whether enough vehicles come into the direct communication range 130 and exhibit, experience, and/or detect the extant condition 129B which causes those vehicles to generate an instance of the V2V communication 140 that has the same condition identifier 142. Specifically, the ITR application 122 may determine whether subsequent and/or adjacent vehicles send substantially similar instances of the V2V communication 140 that also indicate and include the same condition identifier 142 sent by the vehicle 102A. For example, in an embodiment, if both the vehicle 102A and the vehicle 102B experience the extant condition 129B and each generates instances of the V2V communication 140 that include the condition identifier 142, then the ITR application 122 may intercept, obtain, or otherwise receive a plurality of V2V communication, such as two or more instances of the V2V communication 140 that have the same condition identifier (e.g., the condition identifier 142). The ITR application 122 may analyze the difference in time with which the instances of the V2V communication 140 was received from the vehicle 102A and the vehicle 102B. In some embodiments, as long as the difference in time is below the retention time period 121 (e.g., based on determining the difference between each time stamp corresponding to when the ITR application 122 received each V2V communication), then the ITR application 122 may proceed with determining whether the user plane package 150 should be generated and/or sent (and in some embodiments the identity of the destination network access node that should be the targeted recipient of the user plane package 150). In some embodiments, the retention time period 121 may be a time value indicated in seconds, minutes, or any other time unit.

In various embodiments, the ITR application 122 may determine whether the amount of V2V communication 140 instances that have the condition identifier 142 that points to the extant condition identifier 129 exceeds the extant condition threshold 129A. The extant condition threshold 129A can indicate a value representing the minimum number of V2V communications that must be received within the retention time period 121 so as to authorize and/or cause the user plane package 150 to be sent to one or more instance of the destination network access node (e.g., any of the 110B-110N). For example, the ITR application 122 can determine that two instances of the V2V communication 140 having the condition identifier 142 are received, each instance from one of the vehicle 102A and the vehicle 102B via an instance of the vehicle communication interface 103 that uses the direct transmission mode 106. The ITR application 122 can determine that the condition identifier 142 points to the extant condition identifier 129 based on the condition identifier index 126, and therefore both of the vehicles 102A and 102B may be experiencing the extant condition 129B. In an embodiment, the extant condition threshold 129A can indicate a value of "2", thereby indicating that at least two instances of an extant condition should be determined to trigger, authorize, and/or cause generation and/or routing of the user plane package 150 that includes the V2V communication 140'. Because two instances of the V2V communication 140 were received from the vehicles 102A, 102B, the ITR application 122 can determine that the extant condition threshold 129A has been met and the user plane package 150 can be generated and/or authorized for transmittal and/or routing to a destination network access node.

In various embodiments, the ITR application 122 that initially received the V2V communication 140 may determine which instance of an ITRU (e.g., any of the ITRUs 110B-110N) should be targeted as a destination network access node. For example, the ITR application 122 may determine that a travel condition associated with the V2V communication 140 was experienced within the direct communication range 130 of the ITRU 110A, and therefore the ITR application 122 may use the ITRU location identifier 123A corresponding to the ITRU 110A as a starting location from which to determine which instances of the ITRUs 110B-110N should be designated as a destination network access node that should receive an instance of the user plane package 150 that includes the V2V communication 140'. The ITR application 122 can determine which ITRUs are located in an impacted location 164 which may be affected and/or otherwise may cause a subsequent vehicle (e.g., the vehicle 102N) to experience the travel condition (e.g., the extant condition 129B) that originally caused the vehicle 102A and/or the vehicle 102B to generate the V2V communication 140 having the condition identifier 142. The ITR application 122 may determine that the ITRU 110B is located in the impacted location 164, and therefore at least the ITRU 110B may be designated as a destination network access node that should receive the user plane package 150. In some embodiments, an increase in the amount of instances of the V2V communication 140 having the same condition identifier 142 that are received from one or more of the vehicles 102A-102N by the same ITRU (e.g., the ITRU 110A) within the retention time period 121 may cause the ITR application 122 to extend the coverage of the impacted location 164 so as to include additional instances of an ITRU that are designated as a destination network access node (e.g., the ITRU 110C and the ITRU 110N). The impacted location 164 can correspond with the impacted location identifier 124, and therefore, any ITRUs 110B-110N having ITRU location identifiers 123B-123N that are associated and/or correlate with the impacted location identifier 124 may be designated as a destination network access node that should receive an instance of the user plane package 150. In various embodiments, the ITRU location identifiers 123A-123N may include identifiers and addresses that are network addressable and/or identifiable at a location in the network 180 and/or a geographical location.

By way of example without limitation, in an embodiment, the vehicles 102A, 102B may be traveling southbound on a roadway, where the ITRU 110A is located within the direct communication range 130 of the vehicles 102A, 102B. The vehicle 102N may also be traveling southbound along the same roadway, but may be behind (i.e., further upstream or up-road) the vehicles 102A, 102B such that the vehicle 102N is outside of the direct communication range 130 corresponding to the vehicles 102A, 102N. Additionally, the ITRUs 110C and 110N may be located even further up the road from the ITRU 110A and ITRU 110B, and therefore may not be in direct communication range 130 of each other. In this example, the ITR application 122 may determine that the extant condition 129B may cause a traffic jam and/or represent a roadway hazard sufficient to justify informing and/or alerting other vehicles to the extant condition 129B. The ITR application 122 can use the ITRU location identifiers 123A-123N to determine the locations of each of the ITRUs 110A-110N and determine which of the ITRUs 110B-110N are in the impacted location 164 (i.e., associated with the impacted location identifier 124), where the impacted location 164 represents a geographical area before the extant condition 129B which may include vehicles that can be impacted by the extant condition 129B. Therefore, in this example, the ITR application 122 may determine that at least the ITRU 110B should be designated as a destination network access node because the ITRU 110B is located within the impacted location 164 and outside of the direct communication range 130 of the ITRU 110A, the vehicle 102A, and the vehicle 102B. It is understood that, in various embodiments, the vehicles 102A, 102B, and 102N may be referred to as a first vehicle, second vehicle, and third vehicle, respectively. It should be understood that the examples provided are for illustration purposes only, and therefore should not be construed as limiting in any way.

In some embodiments, the user plane package 150 can include an instance of a V2X communication (e.g., the V2X communication 152) that is generated by the ITR application 122 based on the V2V communication 140'. The ITR application 122 may keep the V2V communication 140' intact and generate the V2X communication 152 that is configured to be transmitted or otherwise provided using the network transmission mode 107. For example, one or more instances of the V2X communication 152 may be configured as at least one of the V2N communication 154, the V2I communication 156, or the V2P communication 158. Put differently, in addition to the V2V communication 140', the ITR application 122 can include any of the V2N communication 154, the V2I communication 156, and/or the V2P communication 158 within the user plane package 150. This is because the V2X communication 152 (e.g., any of the V2N communication 154, the V2I communication 156, and/or the V2P communication 158) can be configured to use the roadside unit network communication interface 117 for transmission over the network transmission mode 107. The ITR application 122 can configure the V2X communication 152 (e.g., any of the V2N communication 154, the V2I communication 156, and/or the V2P communication 158) to use a Uu interface, which may correspond to the roadside unit network communication interface 117 and the network communication interface 104 (e.g., of the vehicle 102N).

In some embodiments, the ITR application 122 can configure the user plane package 150 so as to instruct, trigger, and/or cause the destination network access node (e.g., the ITRU 110B) to decapsulate the V2V communication 140' from the user plane package 150 such that the V2V communication 140' remains intact. By this, the time with which the ITRU 110B spends processing the user plane package 150 may be decreased, which in turn can decrease end-to-end latency of providing V2X communications outside of the direct communication range 130 of the sending V2X device (e.g., the ITRU 110A and/or the vehicle 102A). In some embodiments, the user plane package 150 can include instructions that command the ITRU 110B to transmit and provide the V2V communication 140' to any vehicle that is within direct communication range 130 from the ITRU 110B, such as the vehicle 102N. In some embodiments, the user plane package 150 may include an identifier corresponding to the vehicle 102N such that when the vehicle 102N is within the direct communication range 130 from the ITRU 110B, the ITRU 110B can provide the V2V communication 140' to the vehicle 102N via the vehicle communication interface 103 using the direct transmission mode 106.

In some embodiments, if the user plane package 150 already includes one or more instance of the V2X communication 152 that is configured to be transmitted using the network transmission mode 107 (e.g., any of the V2N communication 154, the V2I communication 156, and/or the V2P communication 158), then the ITRU 110B may extract the V2X communication 152 and transmit to one or more V2X capable devices that can receive the V2X communication using the direct transmission mode 106 from the roadside unit network communication interface 117 (e.g., any of the UE 160, the CID 170, and/or the vehicle 102N using the network communication interface 104). In some embodiments, the user plane package 150 may be configured to instruct each instance of a destination network access node (e.g., any of the ITRUs 110B-110N) to generate an instance of the V2X communication 152 that initiates use of the roadside unit network communication interface 117 (e.g., a Uu interface) so as to transmit via the network transmission mode 107. The V2X communication 152 that is generated by the destination network access node (e.g., any of the ITRUs 110B-110N) may be based on the V2V communication 140' that was included and encapsulated in the user plane package 150. In some embodiments, the head unit 105 may be configured as an instance of user equipment that is equipment to receive V2N communications (e.g., the V2N communication 154) over an instance of the network communication interface 104 that uses the network transmission mode 107. In various embodiments, the V2V communication 140' and/or the V2X communication 152 can cause a receiving device (e.g., any of the vehicle 102N, the UE 160, and/or the CID 170) to present an audio and/or visual alert and/or affect or alter a function or operation of the receiving device. For example, in an embodiment, the CID 170 may receive the V2I communication 156 that was generated (by any of the sending or receiving ITRU, such as the ITRU 110A and ITRU 110B) based on the V2V communication 140'. The CID 170 can include the display 172 that, in some embodiments, may be present a speed limit or other traffic alert through a visual interface. Because of the V2V communication 140', the V2I communication 156 may cause the CID 170 to (re)configure the display 172 so as to alter or present an output that affects traffic and/or vehicle operation outside of the direct communication range 130 corresponding to the initial vehicle that generated the V2V communication 140 (e.g., the vehicle 102A which may be referred to as the first vehicle).

In some embodiments, the V2P communication 158 can cause the UE 160 to present the condition identifier 142 from the V2V communication 140' so as to alert the UE 160 of the extant condition 129B up ahead. In some embodiments, the V2N communication 154 that is generated based on the V2V communication 140' (either by the ITRU 110A and included in the user plane package 150, or by the ITRU 110B based on receiving the user plane package 150) can cause the vehicle 102N to present, such as via the head unit 105, the condition identifier 142 and/or an audio and/or visual output so as to alert and/or inform an occupant of the vehicle 102N and/or cause an alteration of a function or operation of the vehicle 102N (e.g., causing the vehicle 102N to slow, present an alternate travel route, stiffen or alter a ride height of vehicle dampeners, etc.). It should be understood that the examples provided are for illustration purposes only, and therefore should not be construed as limiting in any way.

In some embodiments, the user plane package 150 can be configured so as to instruct the destination network access node (e.g., the ITRU 110B) to transmit the V2V communication 140' to every vehicle that is within the direct communication range 130 from the ITRU 110B over the roadside unit vehicle communication interface 115 (e.g., PC5 interface) using the direct transmission mode 106. In some embodiments, the ITRU 110B may transmit the V2V communication 140' from the user plane package 150 to one or more vehicles (e.g., the vehicle 102N) until the destination network access node (e.g., the ITRU 110B) receives a cease distribution instruction 125. The cease distribution instruction 125 may be included in another instance of a user plane package 150 that is sent after the first (or initial) user plane package 150 that included the V2V communication 140'. In some embodiments, the ITR application 122 on the ITRU 110A may determine that vehicles no longer are transmitting the V2V communication 140 with the condition identifier 142, and therefore the ITR application 122 may generate the cease distribution instruction 125 that can be sent to a destination network access node (e.g., the ITRU 110B) so as to stop or otherwise cease distribution and transmission of the V2V communication 140' to vehicles within the direct communication range 130 from the ITRU 110B.

FIG. 1 illustrates the operating environment 100 having one instance of the plurality of vehicles 102A-102N, the vehicle communication interface 103, the network communication interface 104, the head unit 105, the direct transmission mode 106, the network transmission mode 107, the plurality of ITRUs 110A-110N, the processor 111, the operating system 112, the RUCC 113, the direct communication transceiver 114, the roadside unit vehicle communication interface 115, the network access transceiver 116, the roadside unit network communication interface 117, the memory 120, the ITR application 122, the retention time period 121, the ITRU location identifiers 123A-123N, the impacted location identifier 124, the cease distribution instruction 125, the condition identifier index 126, the plurality of condition identifiers 128, the extant condition identifier 129, the extant condition threshold 129A, the extant condition 129B, the direct communication range 130, the extant condition location 131, the V2V communication 140, the condition identifier 142, the V2V communication 140', the user plane package 150, the V2X communication 152, the V2N communication 154, the V2I communication 156, the V2P communication 158, the UE 160, the user 162, the impacted location 164, the CID 170, the display 172, the network 180, and the RAN 182. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Figure 2:
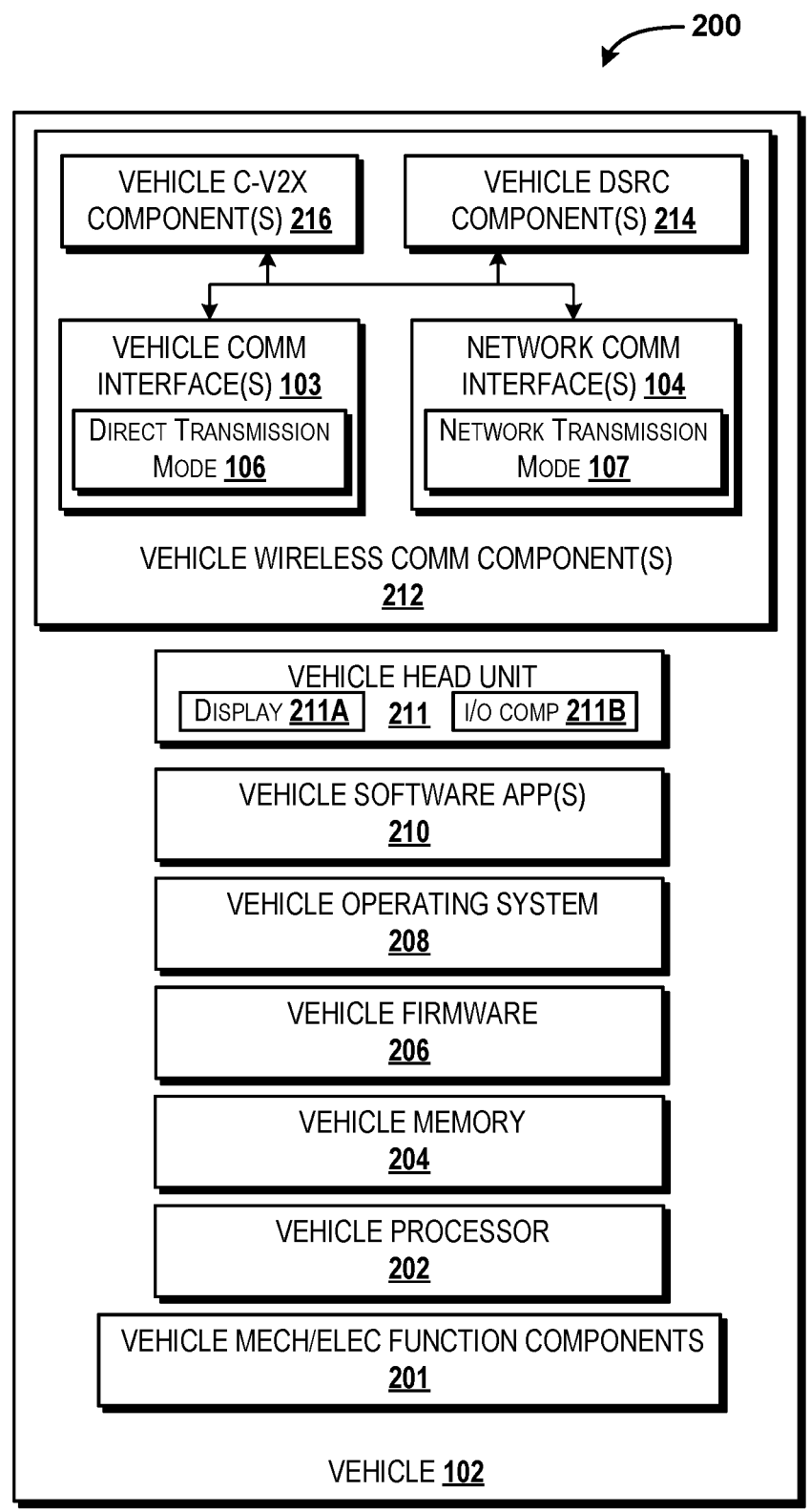
FIG. 2 is a block diagram illustrating aspects of a vehicle capable of implementing aspects of the embodiments disclosed herein.

Turning now to FIG. 2 with continued reference to FIG. 1, a block diagram 200 illustrating an instance of a vehicle 102 and components thereof will be described, according to an illustrative embodiment. It is understood that one or more of the plurality of vehicles 102A-102N illustrated and discussed with respect to FIG. 1 can be configured substantially similar to the vehicle 102 shown and discussed with respect to FIG. 2. The vehicle 102 shown in FIG. 2 is illustrated for purposes of clarity of discussion, and therefore is provided as an example. It should be understood that the examples provided are for illustration purposes only, and therefore should not be construed as limiting in any way. The vehicle 102 and components thereof will be described, according to an illustrative embodiment of the concepts and technologies disclosed herein. The illustrated vehicle 102 includes vehicle mechanical/electrical function components 201, a vehicle processor 202, a vehicle memory 204, a vehicle firmware 206, a vehicle operating system 208, one or more vehicle software application 210, a vehicle head unit 211, a display 211A, an input/output component 211B, a vehicle wireless communications component 212, an instance of the vehicle communication interface 103 that supports the direct transmission mode 106, an instance of the network communication interface 104 that supports the network transmission mode 107, a DSRC component 214, and a C-V2X component 216. Each of these components will now be described in detail.

The vehicle mechanical/electrical function components 201 can include mechanisms, circuitry, elements, and/or components of the vehicle 102 that enable the vehicle to function and operate. For example, one or more instances of vehicle mechanical/electrical function components 201 can include, an engine, a transmission, a braking system, a transmission control unit, an engine control unit, a battery, an electrical system, a safety system, a heating ventilation and air conditioning system, a lighting system, a sensor system, or any other component or element that may facilitate function of the vehicle 102 and/or support one or more of the operations discussed herein.

The vehicle processor 202 can include one or more hardware components that perform computations to process data, and/or to execute computer-executable instructions of one or more application programs such as the vehicle software application(s) 210, one or more operating systems such as the vehicle operating system 208, other software, and/or the vehicle firmware 206. The vehicle processor 202 can include one or more central processing units ("CPUs") configured with one or more processing cores. The vehicle processor 202 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the vehicle processor 202 can include one or more discrete GPUs. In some other embodiments, the vehicle processor 202 can include CPU and GPU components that are configured in accordance with a co-processing CPU/GPU computing model, wherein the sequential part of an application executes on the CPU and the computationally-intensive part is accelerated by the GPU. The vehicle processor 202 can include one or more system-on-chip ("SoC") components along with one or more other components illustrated as being part of the vehicle 102, including, for example, the vehicle memory 204, the vehicle wireless communications component 212, the DSRC component 214, or some combination thereof. In some embodiments, the vehicle processor 202 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The vehicle processor 202 can be or can include one or more hardware components architected in accordance with an ARM architecture, available for license from ARM HOLDINGS of Cambridge, United Kingdom. Alternatively, the vehicle processor 202 can be or can include one or more hardware components architected in accordance with an x86 architecture, such an architecture available from INTEL CORPORATION of Mountain View, Calif., and others. Those skilled in the art will appreciate the implementation of the vehicle processor 202 can utilize various computation architectures, and as such, the vehicle processor 202 should not be construed as being limited to any particular computation architecture or combination of computation architectures, including those explicitly disclosed herein.

The vehicle memory 204 can include one or more hardware components that perform storage operations, including temporary or permanent storage operations. In some embodiments, the vehicle memory 204 include volatile and/or non-volatile memory implemented in any method or technology for storage of information such as computer-readable instructions, data structures, program modules, the vehicle operating system 208, the vehicle firmware 206, the vehicle software application(s) 210, and/or other software, firmware, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the vehicle processor 202.

The vehicle firmware 206, also known as microcode, can be written onto a ROM of the vehicle memory 204. The vehicle firmware 206 can be written on the ROM at the time of manufacturing and is used to execute programs on the vehicle processor 202. In some embodiments, the vehicle firmware 206 includes the vehicle operating system 208. In some embodiments, the vehicle firmware 206 is the vehicle operating system 208. In some embodiments, the vehicle firmware 206 and the vehicle operating system 208 are closely integrated for performance of operations of the vehicle 102.

The vehicle operating system 208 can control the operation of at least a portion of the vehicle 102. In some embodiments, the vehicle operating system 208 includes the functionality of the vehicle firmware 206 and/or the vehicle software application(s) 210. The vehicle operating system 208 can be executed by the vehicle processor 202 to cause the vehicle 102 to perform various operations. The vehicle operating system 208 can include, by way of example without limitation, a member of the SYMBIAN OS family of operating systems from SYMBIAN LIMITED; a member of the WINDOWS OS, WINDOWS MOBILE OS, and/or WINDOWS PHONE OS families of operating systems from MICROSOFT CORPORATION; a member of the PALM WEBOS family of operating systems from HEWLETT PACKARD CORPORATION; a member of the BLACKBERRY OS family of operating systems from RESEARCH IN MOTION LIMITED; a member of the IOS family of operating systems or a member of the OS X family of operating systems from APPLE INC.; a member of the ANDROID OS family of operating systems from GOOGLE INC.; an open-source software operating system build around the LINUX kernel; a member of a real-time operating system; a member of a portable operating system interface automotive open system architecture and/or other operating systems. These operating systems are merely illustrative of some contemplated operating systems that may be used in accordance with various embodiments of the concepts and technologies described herein and therefore should not be construed as being limiting in any way. The vehicle software application(s) 210 can execute on top of the vehicle operating system 208. The vehicle software application(s) 210 can be executed by the vehicle processor 202 to cause the vehicle 102 to perform various operations described herein. For example, the vehicle software application(s) 210 can be part of a vehicle entertainment system, a vehicle navigation system, a vehicle electronic control unit ("ECU"), and/or another computing system of the user vehicle.

The vehicle head unit 211 may be configured substantially similar to the head unit 105 discussed above with respect to FIG. 1. In some embodiments, the vehicle head unit 211 can include the display 211A that can be configured to present and/or provide audio output and/or video output via one or more user interface. The display 211A of the vehicle head unit 211 can present a condition identifier (e.g., any of the plurality of condition identifiers 128) to a user or other occupant associated with the vehicle 102. In some embodiments, the input/output component 211B can provide a user touch-screen, audio speakers, microphones, haptic feedback system, or other input and/or output device or component that can alert a user to V2X communications.

The vehicle wireless communications component 212 can include one or more wireless wide area network ("WWAN") components capable of facilitating communication with one or more WWANs, such as the network 180 via the RAN 182 via the network transmission mode 107. In some embodiments, the vehicle wireless communications component 212 is configured to provide multi-mode connectivity. For example, the vehicle wireless communications component 212 may be configured to provide connectivity to the RAN 182, wherein the RAN 182 functions in accordance with UMTS, LTE, and 5G technologies, or via some other combination of technologies, and more particularly, one or more technologies that support cell broadcast functionality. In various embodiments, the vehicle wireless communications component 212 can include one or more instances of a transceiver, sensors, cameras, circuitry, antennas, and any other components that can support and facilitate V2X transmissions over the vehicle communication interface 103 using the direct transmission mode 106 and/or the network communication interface 104 using the network transmission mode 107. In some embodiments, the vehicle communication interface 103 can be provided and/or hosted by the DSRC component 214 and/or the C-V2X component 216.

The DSRC component 214 can be a radio communications device and/or circuitry that can send and receive V2X communications using the direct transmission mode 106. In some embodiments, the DSRC component 214 is configured to operate within a 5.9 GHz radio frequency band as defined by the United States Department of Transportation. In some embodiments, the DSRC component 214 is configured to operate within other radio frequency bands. In some embodiments, the DSRC component 214 can operate using 802.11p or other technology.

The C-V2X component 216 can be a radio communications device and/or circuitry that can send and receive V2X communications using the direct transmission mode 106 and/or the network transmission mode 107. In some embodiments, the C-V2X component 216 can operate in accordance with 3GPP Release 14 or later. The C-V2X component 216 can support and provide the vehicle communication interface 103 and/or the network communication interface 104. In various embodiments, the C-V2X component 216 can be configured to support 5G NR transmissions and direct communication transmissions so that V2X communications may occur within and/or outside of a direct communication range. In some embodiments, the C-V2X component 216 can transmit and receive V2X communications over the direct transmission mode 106 within an ITS spectrum, such as a 5.9 GHz ITS band. In some embodiments, the C-V2X component 216 can provide transmission latency that is no more than a defined amount of milliseconds (e.g., less than 10 milliseconds). In some embodiments, the network access transceiver 116 and/or the direct communication transceiver 114 can include, and/or be configured as, the C-V2X component 216.

Figures 3A, 3B:
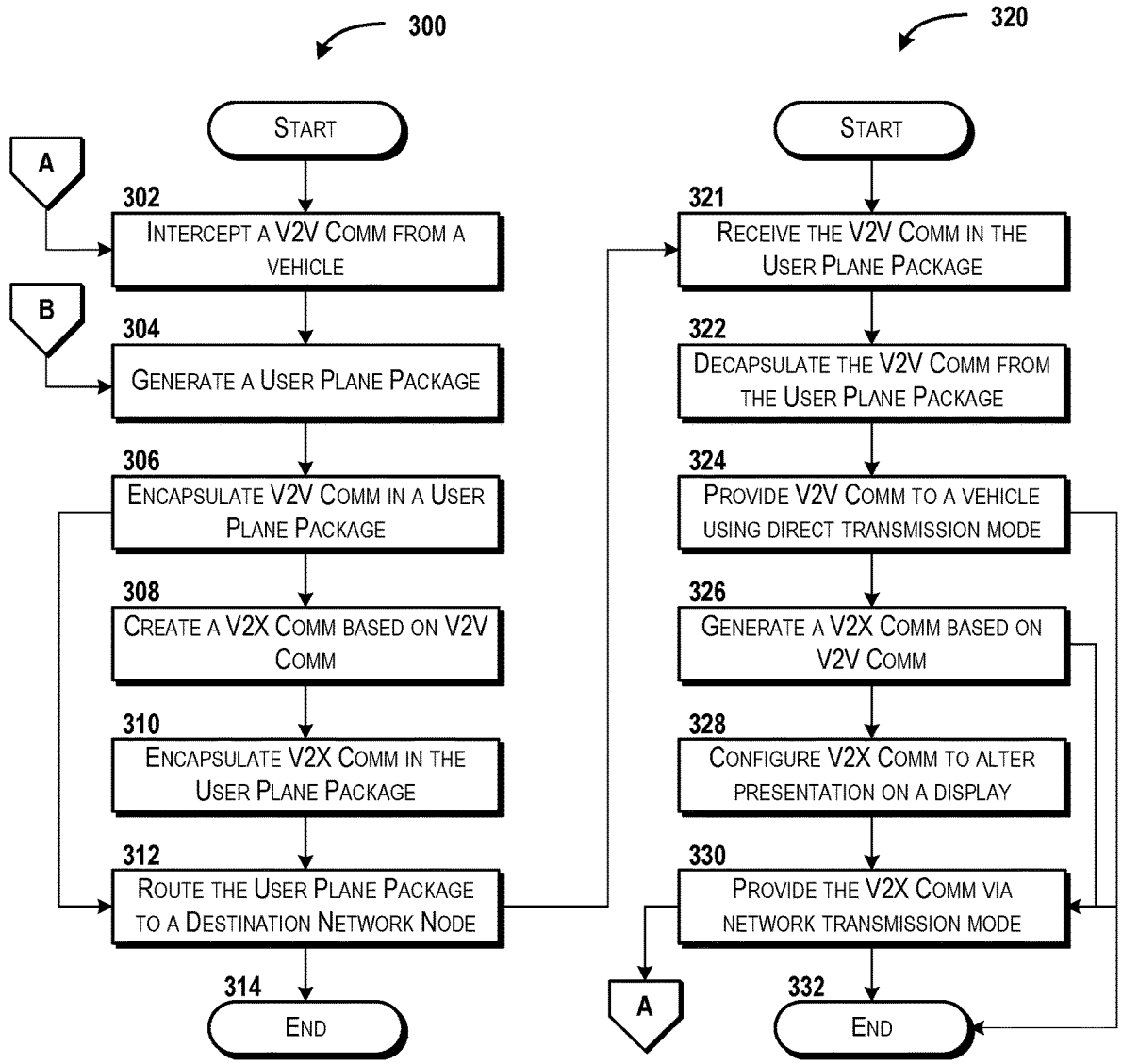
FIG. 3A is a flow diagram illustrating aspects of a method for mitigating network congestion while supporting vehicle communications, according to an illustrative embodiment.
FIG. 3B is a flow diagram illustrating aspects of another method for mitigating network congestion while supporting vehicle communications, according to an illustrative embodiment.
Figure 4:
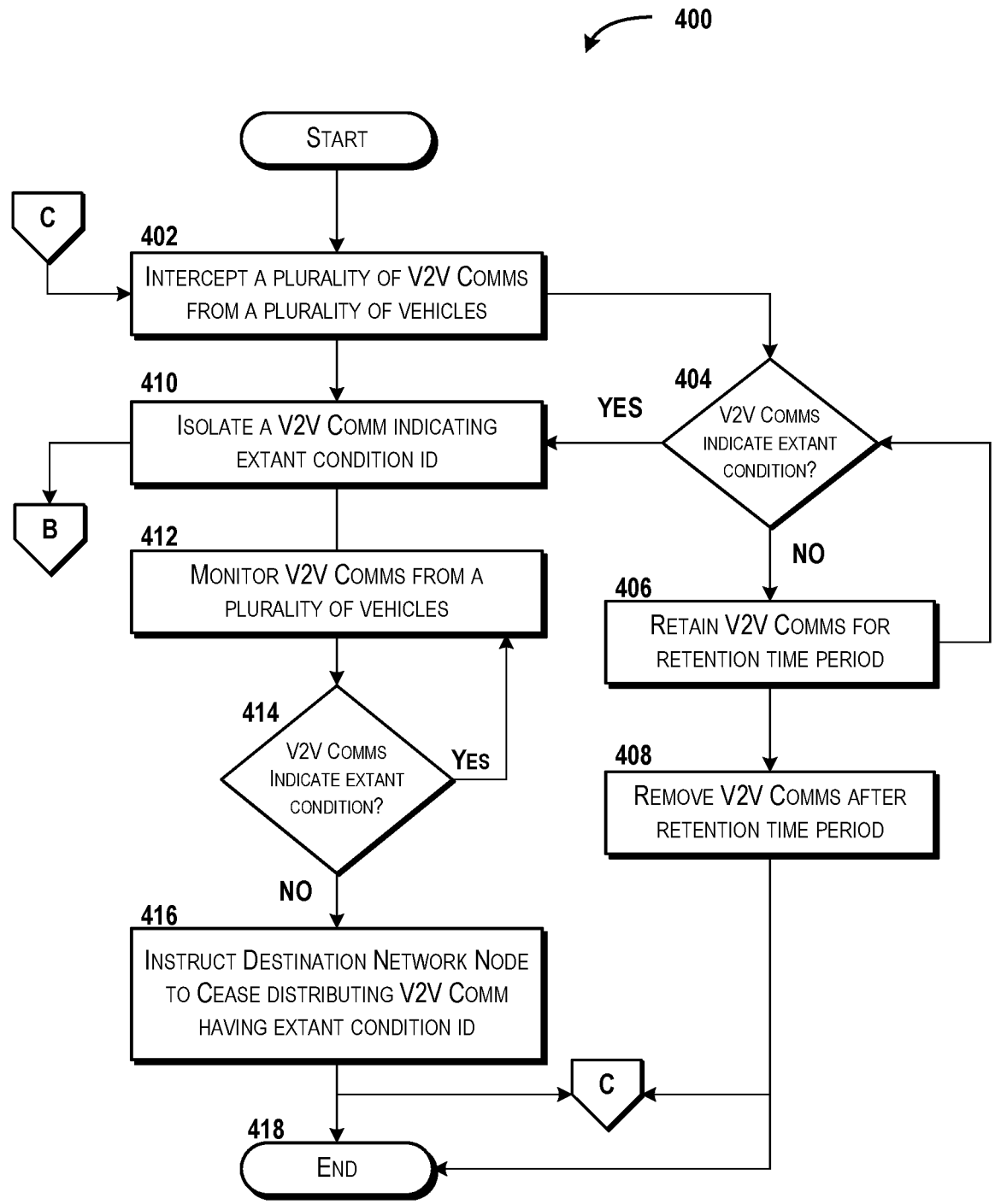
FIG. 4 is a flow diagram illustrating aspects of yet another method for mitigating network congestion while supporting vehicle communications, according to an illustrative embodiment.

Turning now to FIGS. 3A, 3B, and 4 with continued reference to FIGS. 1 and 2, aspects of a method 300, a method 320, and a method 400 for embodiments pertaining to aspects of mitigating network congestion while supporting vehicle communications will be described in detail, according to various illustrative embodiments. It should be understood that each of the operations of the one or more methods disclosed herein (e.g., the method 300, the method 320, and/or the method 400 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, edge devices, an ITRU, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the plurality of vehicles 102A-102N, the plurality of ITRUs 110A-110N, the UE 160, the CID 170, the network 180, and/or the RAN 182, to perform one or more operations and/or causing one or more instances of a processor to direct other components of a computing system or device, to perform one or more of the operations.

For purposes of illustrating and describing the concepts of the present disclosure, the operations of methods disclosed herein are described as being performed by one or more instance of an ITRU, such as any of the ITRU 110A, the ITRU 110B, and/or the ITRU 110N, via execution of one or more computer-readable instructions configured so as to instruct and transform a processor, such as, for example without limitation, the ITR application 122 that can configure one or more processor (e.g., the processor 111). It should be understood that additional and/or alternative devices and/or network components can, in some embodiments, provide the functionality described herein via execution of one or more modules, applications, and/or other software including, but not limited to, the vehicle software application 210, the vehicle firmware 206, the vehicle operating system 208, and/or any other computer executable instructions that can configure one or more of the UE 160, the CID 170, network 180, and/or the RAN 182. Thus, the illustrated embodiments are illustrative, and should not be viewed as being limiting in any way.

In various embodiments, any instance of an ITRU (e.g., any of the plurality of ITRUs 110A-110N) can execute an instance of the ITR application 122 so as to cause one or more processor (e.g., an instance of the processor 111) to perform at least a portion of one or more operations discussed herein. In various embodiments, execution of the ITR application 122 can cause one or more instance of an ITRU (e.g., any of the plurality of ITRUs 110A-110N) to perform one or more operations discussed herein. For example, in some embodiments, any of the plurality of ITRUs 110A-110N may be configured by the ITR application 122 to perform any of the operations discussed with respect to the methods 300, 320, and/or 400. In various embodiments, the ITR application 122 can cause one instance of an ITRU (e.g., the ITRU 110A) to perform one or more operations from the methods 300, 320, and/or 400, while also causing another instance of an ITRU (e.g., the ITRU 110B and/or the ITRU 110N) to perform one or more operations from the methods 300, 320, and/or 400. It should be understood that the examples provided are for illustration purposes only, and therefore should not be construed as limiting in any way. The method 300, the method 320, and the method 400 will be described with reference to one or more of the FIGS. 1 and 2.

Turning now to FIG. 3A, the method 300 for mitigating network congestion while supporting vehicle communications is disclosed, according to an illustrative embodiment. In an embodiment, the method 300 can be performed by the ITRU 110A that executes the processor 111 that is configured by the ITR application 122. The ITRU 110A can communicatively couple to the network 180 and/or the RAN 182. It is understood that one or more operations of the method 300 may be performed by any other instance of the plurality of ITRUs 110A-110N. In various embodiments, the method 300 can begin at operation 302, where the ITRU 110A can intercept a vehicle-to-vehicle communication that is provided from a first vehicle to a second vehicle. For example, the ITRU 110A can intercept, receive, or otherwise obtain an instance of the V2V communication 140 that includes the condition identifier 142. The V2V communication 140 may have been transmitted or otherwise provided from the vehicle 102A via the vehicle communication interface 103 that uses the direct transmission mode 106. Because the ITRU 110A and the vehicle 102B are located within the direct communication range 130 of the vehicle 102A, each of the ITRU 110A and the vehicle 102B may receive the V2V communication 140. In various embodiments, the V2V communication 140 can include the condition identifier 142 that corresponds with a travel condition identified in the condition identifier index 126, which in turn may point to the extant condition identifier 129 that represents the extant condition 129B. As discussed above with respect to FIG. 1, the direct transmission mode 106 can refer to two or more devices (e.g., any of the plurality of vehicles 102A-102N, the UE 160, the CID 170, and/or the ITRUs 110A-110N) communicating directly with each other while within the direct communication range 130 of each other and without a sending device requesting network assistance (i.e., without the sending device requesting that an instance of a V2V communication be transmitted via a network access node, the network 180, and/or one or more instance of the RAN 182). Therefore, one or more V2X devices that are within the direct communication range 130 of each other (e.g., the vehicle 102A, the vehicle 102B, and the ITRU 110A) may be capable of obtaining the V2V communication 140 provided using the vehicle communication interface 103 (e.g., PC5 interface) using the direct transmission mode 106. In the example given above, the vehicle 102A may be configured to generate an instance of the V2V communication 140 that includes the condition identifier 142 in response to detecting the travel condition corresponding with the condition identifier 142.

From operation 302, the method 300 can proceed to operation 304, where the ITRU 110A can generate an instance of the user plane package 150. The user plane package 150 can be configured to conform to a user plane architecture that allows for communication between the ITRU 110A and one or more network device within the RAN 182, such as without limitation, an S-GW over an Si interface.

From operation 304, the method 300 can proceed to operation 306, where the ITRU 110A can encapsulate the vehicle-to-vehicle communication in the user plane package 150. For example, in some embodiments, the ITRU 110A can encapsulate the V2V communication 140' within the user plane package 150, where the V2V communication 140' is the V2V communication 140 or a copy of the V2V communication 140. The user plane package 150 can be configured so as to allow the V2V communication 140' to remain intact (i.e., without modification). In some embodiments, the user plane package 150 can be configured to instruct the destination network access node (e.g., any of the ITRUs 110B-110N) to decapsulate the V2V communication 140' from the user plane package 150 such that the V2V communication 140 remains intact. In some embodiments, the user plane package 150 can be configured to instruct the destination network access node (e.g., any of the ITRUs 110B-110N) to provide the V2V communication 140' (and/or any other instance of the V2X communication 152) to a third vehicle (e.g., the vehicle 102N). In some embodiments, the V2V communication 140' can be provided to the third vehicle (e.g., the vehicle 102N) via the vehicle communication interface 103 (e.g., PC5 interface) that uses the direct transmission mode 106. In some embodiments, the user plane package 150 can be configured to instruct the destination network access node (e.g., any of the ITRUs 110B-110N) to generate (or otherwise use) an instance of the V2N communication 154 based on the V2V communication 140' that was included in the user plane package 150 (or generated based on the user plane package 150). In some embodiments, the user plane package 150 can be configured to instruct the destination network access node (e.g., any of the ITRUs 110B-110N) to provide the V2N communication 154 to one or more user equipment associated with the vehicle 102N (e.g., an instance of the head unit 105 that is configured as a V2X capable device that has access to the vehicle communication interface 103 and the network communication interface 104). The V2N communication 154 can be provided from the destination network access node (e.g., the ITRU 110B) to the one or more user equipment (e.g., the head unit of the vehicle 102B) over the network communication interface 104 of the vehicle 102B using the network transmission mode 107. In some embodiment, the method 300 may proceed from operation 306 to operation 312 discussed below. In some embodiments, the method 300 may proceed from operation 306 to operation 308. For clarity, a discussion of operation 308 will be provided first, followed by a discussion of operation 312.

From operation 306, the method 300 can proceed to operation 308, where the ITRU 110A may create a V2X communication 152 based on the V2V communication 140', where the V2X communication 152 is configured to be transmitted using the network transmission mode 107 over the roadside unit network communication interface 117 (e.g., Uu interface). The V2X communication 152 may be configured as any of the V2N communication 154, the V2I communication 156, and/or the V2P communication 158.

From operation 308, the method 300 can proceed to operation 310, where the ITRU 110A can encapsulate the V2X communication 152 within the user plane package 150. The V2X communication 152 can be included within the user plane package 150 along with the V2V communication 140' such that the V2V communication 140' is not modified and thus preserved.

From operation 310, the method 300 can proceed to operation 312, where the ITRU 110A can provide, transmit, and/or route the user plane package 150 to a destination network access node that is outside of a direct communication range corresponding to the first vehicle and the second vehicle. For example, the ITRU 110A can provide, transmit, and/or route the user plane package 150 to the ITRU 110B that is located outside of the direct communication range 130 corresponding to the vehicle 102A, the vehicle 102B, and the ITRU 110A. In some embodiments, from operation 312, the method 300 can proceed to operation 314, where the method 300 may end. In some embodiments, the method 300 may proceed to one or more operations of the method 320, which is discussed below with respect to FIG. 3B.

Turning now to FIG. 3B, the method 320 for mitigating network congestion while supporting V2X communications is disclosed, according to an illustrative embodiment. In an embodiment, the method 320 can be performed by one or more of the plurality of the ITRUs 110A-110N via execution of an instance of the processor 111 that is configured by an instance of the ITR application 122. In some embodiments, one instance of an ITRU may perform one or more operations of the method 320 subsequent and/or in response to one or more operations of the method 300 being performed by another ITRU. For example, in an embodiment, the ITRU 110A may perform the operations of the method 300, while the ITRU 110B may perform the operations of the method 320 discussed below. It is understood that the roles may be reversed such that the method 300 may be performed by the ITRU 110B, while the method 320 may be performed by the ITRU 110A. In some embodiments, the operations of the method 320 may be performed based on instructions, commands, and/or other data (e.g., a user plane package) that can configure an instance of an ITRU (e.g., any the ITRUs 110A-110N) to perform one or more operations of the method 320. For purposes of clarity, the method 320 will be discussed as being performed by the ITRU 110B, according to an illustrative embodiment. In the illustrated embodiment, the ITRU 110B can be considered as a destination network access node that is a target of a user plane package discussed in FIG. 3A. In an embodiment, the ITRU 110B can perform the method 320 by executing the processor 111 that is configured, at least in part, by the ITR application 122. It should be understood that the examples provided are for illustration purposes only, and therefore should not be construed as limiting in any way.

In various embodiments, the method 320 can begin at operation 321, where the ITRU 110B can receive the V2V communication 140' via the user plane package 150 despite the ITRU 110B being located outside of the direct communication range 130 of the vehicle 102 that generated the V2V communication 140.

From operation 321, the method 320 can proceed to operation 322, where the ITRU 110B can decapsulate the V2V communication 140' from the user plane package 150 such that the V2V communication 140' remains intact. This can allow the ITRU 110B to transmit the V2V communication 140' using the direct transmission mode 106 without (re)configuration and/or modification because the V2V communication 140' is already configured to be transmitted from the roadside unit vehicle communication interface 115 using the direct transmission mode 106.

From operation 322, the method 320 can proceed to operation 324, where the ITRU 110B can provide the V2V communication 140' to a third vehicle that is located outside of the direct communication range 130 of the first vehicle and sending ITRU, such as providing the V2V communication 140' to the vehicle 102N that is located outside of the direct communication range 130 corresponding to the vehicle 102A, the vehicle 102B, and the ITRU 110A. The V2V communication 140' can be provided to the vehicle communication interface 103 of the vehicle 102N using the direct transmission mode 106. In some embodiments, the method 320 may proceed from operation 324 to operation 330, which is discussed below. In some embodiments, the method 320 may proceed from operation 324 to operation 332, where the method 320 can end. In some embodiments, the method 320 may proceed from operation 324 to operation 326. For clarity, a discussion of the operation 326 will be provided first, follow by a discussion of operation 330.

At operation 326, the ITRU 110B may generate the V2X communication 152 that is based on the V2V communication 140', where the V2X communication 152 is configured to be transmitted from the roadside unit network communication interface 117 (e.g., Uu interface) using the network transmission mode 107. The V2X communication 152 can include any of the V2N communication 154, the V2I communication 156, and/or the V2P communication 158. In some embodiments, the method 320 may proceed from operation 326 to operation 330 discussed below. In some embodiments, the method 320 may proceed from operation 326 to operation 328. For clarity, a discussion of operation 328 will be provided first, followed by a discussion of operation 330.

At operation 328, the ITRU 110B may configure the V2X communication 152 so as to alter a presentation on a display of the receiving device. For example, the V2X communication 152 may be configured as the V2I communication 156 sent to the CID 170, where the V2I communication 156 is configured to cause the display 172 to be altered and change a presentation of a speed limit or any other traffic alert presentation.

From operation 328, the method 320 can proceed to operation 330, where the ITRU 110B can provide the V2X communication (e.g., the V2N communication 154 in an embodiment) from the roadside unit network communication interface 117 using the network transmission mode 107. In some embodiments where the V2X communication 152 is the V2N communication 154, the ITRU 110B may provide the V2N communication 154 to a head unit of the vehicle 102N, where the head unit is configured as a V2X capable device that has access to components of the vehicle 102N. In some embodiments where the V2X communication 152 is the V2P communication 158, the ITRU 110B may provide the V2P communication 158 to the UE 160 using the network transmission mode 107. In some embodiments where the V2X communication 152 is the V2I communication 156, the ITRU 110B may provide the V2I communication 156 to the CID 170 using the network transmission mode 107.

From operation 330, the method 320 can proceed to operation 332, where the method 320 may end. In some embodiments, the method 320 may proceed to one or more operations of the method 300, such as the operation 302 which is discussed below with respect to FIG. 3A. In some embodiments, one or more of the operations of the method 300 may be performed by the ITRU 110B so as to cause another ITRU (e.g., the ITRU 110A) to perform one or more of the operations of the method 320. It should be understood that the examples provided are for illustration purposes only, and therefore should not be construed as limiting in any way.

Turning now to FIG. 4, the method 400 for mitigating network congestion while supporting vehicle communications is disclosed, according to an illustrative embodiment. In an embodiment, the method 400 can be performed by any of the plurality of the ITRUs 110A-110N executing an instance of the processor 111 that is configured, at least in part, by an instance of the ITR application 122. For clarity purposes, the method 400 will be described as being performed by the ITRU 110A, although it is understood that this may not necessarily be the case for all embodiments. It is understood that, in various embodiments, one or more of the operations may be performed by any instance of an ITRU (e.g., any of the plurality of ITRUs 110A-110N). It should be understood that the examples provided are for illustration purposes only, and therefore should not be construed as limiting in any way.

In some embodiments, the method 400 can begin at operation 402, where the ITRU 110A may intercept, receive, detect, or otherwise obtain a plurality of V2V communications from one and/or a plurality of vehicles, such as multiple instances of the V2V communication 140 provided by one or more of the plurality of vehicles 102A-102N. Each of the plurality of V2V communications 140 can include one or more instance of the condition identifier 142, where each instance of the V2V communication 140 may include the same or different instance of the condition identifier 142 (thus indicating or otherwise being associated with the same or different condition). Put simply, each condition identifier 142 included within an instance of the V2V communication 140 can be based on a sending device (e.g., any of the plurality of vehicles 102A-102N) detecting, determining, and/or experiencing a travel condition (e.g., the extant condition 129B which is discussed below) that may correspond with one of the condition identifiers 128 of the condition identifier index 126. It is understood that, in various embodiments, interception of one or more instance of the V2V communication 140 may not necessarily prevent the V2V communication 140 from being received or otherwise obtained by another V2X capable device (e.g., the vehicle 102B). Stated differently, the performance of the operation 402 by an ITRU (e.g., the ITRU 110A) may not prevent one or more of the plurality of vehicles 102A-102N from receiving the V2V communication 140. As such, an instance of the ITRU (e.g., the ITRU 110A) may obtain information provided by the V2V communication 140 (e.g., the condition identifier 142) without affecting other vehicles' ability to receive and/or obtain the V2V communication 140. It should be understood that the examples provided are for illustration purposes only, and therefore should not be construed as limiting in any way. In some embodiments, the method 400 may proceed from operation 402 to operation 404. In some embodiments, the method 400 may proceed from operation 402 to operation 410. For purposes of clarity only, a discussion of the operation 404 will be discussed first, followed by a discussion of the operation 410 below.

At operation 404, the ITRU 110A may analyze the plurality of instances of the V2V communication 140 so as to determine whether an extant condition 129B is indicated or otherwise exists based on the particular condition identifier (e.g., the condition identifier 142) being provided by the V2V communication 140. In various embodiments, an instance of the extant condition 129B may be a condition experienced, detected, caused by, or otherwise identified by a vehicle affect, impact, or otherwise be relevant to other vehicles, people, devices, and/or any network connected system. For example, the extant condition 129B may identify or otherwise indicate a condition which may impact the operation, safety, travel time, vehicle speed, vehicle direction routing, and/or other function of a vehicle, roadway, infrastructure, or other device. For example, a plurality of instances of the V2V communication 140 may indicate an instance of the condition identifier 142 that corresponds with a loss of traction control. As such, the extant condition 129B that causes loss of traction may be oil on a roadway, a buildup of ice, sand, or other road condition that may cause a loss of traction, as indicated by an instance of the extant condition identifier 129. The vehicle 102A (and other vehicles, such as the vehicle 102B) may have been affected by and/or experienced the extant condition 129B so as to cause the vehicle 102A (and the vehicle 102B) to generate an instance of the V2V communication 140 which includes the vehicle condition identifier 142 based on the extant condition 129B. When the ITR application 122 of an ITRU (e.g., the ITRU 110A) intercepts or otherwise obtains an instance of the V2V communication 140, the ITR application 122 may analyze the condition identifier 142 included within the V2V communication 140. The ITR application 122 may search the condition identifier index 126 to determine which of the plurality of condition identifiers 128 corresponds (or otherwise matches) with the condition identifier 142, and determine whether the condition identifier 142 represents an extant condition, such as by the corresponding one of the plurality of condition identifiers 128 (of the condition identifier index 126) pointing to the extant condition identifier 129 so as to indicate the extant condition 129B.

If ITR application 122 determines that the condition identifier 142 corresponds with an instance of the extant condition identifier 129, then the ITR application 122 may determine that an extant condition may exist (e.g., the extant condition 129B). In some embodiments, the ITR application 122 may confirm whether the extant condition 129B is experienced by enough vehicles to warrant action being taken (i.e., by an amount of instances of the condition identifier 142 corresponding with the extant condition identifier 129 to prompt further operations). For example, in some embodiments, the ITR application 122 may reference the extant condition threshold 129A when determining whether an extant condition exists and/or action should be taken. The extant condition threshold 129A can provide a threshold number of instances of the condition identifiers 142 that must be indicated by the plurality of V2V communications 140 so as to determine that the presence of the extant condition 129B actually exists, remains, or is otherwise not anomalous, thereby causing the ITR application 122 to perform further operations (e.g., generate, provide, and/or route the user plane package 150) discussed herein. For example, if only one instance (or any amount less than the extant condition threshold 129A) of the condition identifier 142 corresponding with the extant condition identifier 129 (e.g., one instance indicating loss of traction) is provided from amongst all of the plurality of instances of the V2V communications 140, then the ITR application 122 may determine that the vehicle condition experienced by the one or more particular vehicles (e.g., the vehicle 102A) was anomalous or otherwise does not warrant action being taken.

Therefore, in various embodiments, if the amount of instances of V2V communications 140 indicating an extant condition (e.g., via the condition identifier 142 corresponding with the extant condition identifier 129) does not equal to or exceed the extant condition threshold 129A, then the ITR application 122 can determine that an extant condition does not exist (or is otherwise not indicated with enough frequency) so as to cause the method 400 to proceed along the NO path from operation 404 to operation 406. If the amount of instances of V2V communications 140 indicating an extant condition (e.g., via the condition identifier 142 corresponding with the extant condition identifier 129) is equal to or exceeds the extant condition threshold 129A, then the ITR application 122 can determine that the extant condition exists (and/or is experienced by enough vehicles) so as to cause the method 400 to proceed along the YES path from operation 404 to operation 410. For clarity, a discussion following the NO path to operation 406 will be provided first, followed by a discussion along the YES path to operation 410.

At operation 406, the ITR application 122 may retain the plurality of V2V communications 140 for the retention time period 121, which can be a defined length of time and may be configured specifically for the particular extant condition. While the ITR application 122 retains the V2V communications 140 in memory, the method 400 may return to operation 404 so that the ITR application 122 can continue to monitor, intercept, and analyze additional instances of V2V communications 140 to determine whether subsequent V2V communications indicate an extant condition so as to bring the amount of instances above the extant condition threshold 129A. If the amount of V2V communications 140 indicating an extant condition (i.e., where instances of the condition identifier 142 are found or otherwise determined to be in the condition identifier index 126 and, in turn, point to or otherwise correspond to the extant condition identifier 129 so as to indicate the extant condition 129B) grows during the retention time period 121 so as to equal or exceed the extant condition threshold 129A before the retention time period 121 expires, then the method 400 may proceed from operation 404 to operation 410. However, if the amount of V2V communications 140 indicating an extant condition (i.e., having instances of the condition identifier 142 corresponding to the extant condition identifier 129) does not equal to or exceed the extant condition threshold 129A before the retention time period 121 expires, then the method 400 may proceed from operations 404 and 406 to operation 410, where the ITR application 122 can remove the V2V communications 140 (which have the condition identifier 142 corresponding to the extant condition identifier 129) from memory (e.g., the memory 120). In some embodiments, the method 400 may proceed from operation 408 to operation 402, where one or more operations of the method 400 may be repeated. In some embodiments, the method 400 may proceed from operation 408 to operation 418, where the method 400 may end.

In various embodiments, the method 400 may proceed to operation 410 from either operation 402 and/or operation 404. At operation 410, the ITR application 122 can isolate an instance of the V2V communication 140 that has a condition identifier corresponding to an extant condition, such as the V2V communication 140 having the condition identifier 142 which indicate or otherwise corresponds with an instance of the extant condition identifier 129. In some embodiments, the ITR application 122 may create a copy of the V2V communication 140 indicating the extant condition identifier 129, such as the V2V communication 140' that can be provided, via another ITRU (e.g., any of the ITRUs 110B-110N) that is a destination network node, to other vehicles and/or devices (e.g., the vehicle 102N) that are outside of (and thus located beyond) the direct communication range 130 associated with the plurality of vehicles 102A and 102B which initially generated and provided the instances of the V2V communication 140. By this, the vehicles 102A and/or 102B may not need to create or otherwise inform the ITRU 110A of the extant condition 129B by creating a V2N communication, but instead the ITR application 122 of an ITRU 110A can inform vehicles (e.g., vehicle 102N) located outside of the direct communication range 130 of the extant condition 129B. In some embodiments, the method 400 may proceed from operation 410 to one or more operations discussed with respect to the methods 300 and/or 320, such as the operation 304. In some embodiments, the method 400 may proceed from operation 410 to operation 412. In some embodiments, the method 400 may proceed to operation 410 after one or more operations from the method 300 and/or 320 occur. It should be understood that the examples provided are for illustration purposes only, and therefore should not be construed as limiting in any way.

At operation 412, the ITR application 122 may monitor incoming instances of the V2V communications 140 from the plurality of vehicles 102A-102N. For example, the ITR application 122 may have encapsulated the V2V communication 140 (or a copy of the V2V communication 140, shown as the V2V communication 140') within a user plane package 150 which is routed or otherwise provided to a destination network access node, such as the ITRU 110B, the ITRU 110C, and/or the ITRU 110N. After sending the user plane package 150, the ITR application 122 may monitor subsequent, incoming instances of V2V communications to determine whether they include any of the plurality of condition identifiers 128 which correspond with or otherwise indicate an extant condition (e.g., via matching with one of the condition identifiers 128 that points to the extant condition identifier 129). If so, then the method 400 may proceed to operation 414.

From operation 412, the method 400 can proceed to operation 414, where the ITR application 122 can determine whether subsequent, incoming V2V communications indicate whether the extant condition still exists or otherwise affects one or more of the plurality of vehicles 102A-102N within the direct communication range 130 of the ITRU 110A. For example, if the extant condition 129B corresponds with ice that causes vehicle traction control loss, and the ice melts, then the subsequent V2V communications may no longer indicate a condition identifier corresponding with the extant condition 129B (and thus the V2V communications may not be associated with one of the plurality of condition identifier 128 of the condition identifier index 126 that points to the extant condition identifier 129). The ITR application 122 can analyze the subsequent, incoming V2V communication (e.g., subsequent instances of the V2V communication 140 relative to the initial V2V communication sent) to determine if they include a condition identifier that matches with one of the condition identifiers 128 that points to the extant condition identifier 129, thereby indicating that subsequent, incoming instance of the V2V communication 140 corresponds with the extant condition identifier 129 associated with an extant condition. If the subsequent, incoming instance of the V2V communication 140 continues to indicate the extant condition, the ITR application 122 may follow the YES path, which may cause the operation 414 to loop back to operation 414, where the ITR application 122 may continue monitoring. If the subsequent, incoming V2V communications no longer indicate the extant condition which was provided in the V2V communication 140' that was encapsulated in the user plane package 150, then the method 400 may proceed along the NO path to operation 416. While one or more of the operations of the method 400 are being performed, the destination network node (e.g., the ITRU 110B) may be continuing to distribute, broadcast, transmit, and/or otherwise provide the V2V communication 140' (and any other V2X communication from the user plane package 150) to a vehicle (e.g., the vehicle 102N) or other V2X capable device that is within an instance of the direct communication range 130 corresponding to the destination network node (e.g., ITRU 110B).

At operation 416, the ITR application 122 may instruct a destination network access node (e.g., any of the ITRUs 110B-110N) to cease distributing the V2V communication 140' (what was encapsulated in the user plane package 150) that includes the condition identifier 142 or otherwise indicates the extant condition identifier 129 via the condition identifier 142. For example, in some embodiments, the ITR application 122 can generate the cease distribution instruction 125 that is configured to cause another instance of an ITRU (e.g., one or more of the ITRUs 110B-110N) to cease transmission of the V2V communication 140' to one or more of the vehicles 102A-102N that are located outside of an instance of the direct communication range 130 corresponding to the first ITRU (e.g., the ITRU 110A) sending the cease distribution instruction 125. In some embodiments, the method 400 may proceed from operation 416 to operation 402, where the method 400 may be repeated. In some embodiments, from operation 416, the method 400 can proceed to operation 418, where the method 400 can end.

Figure 5:
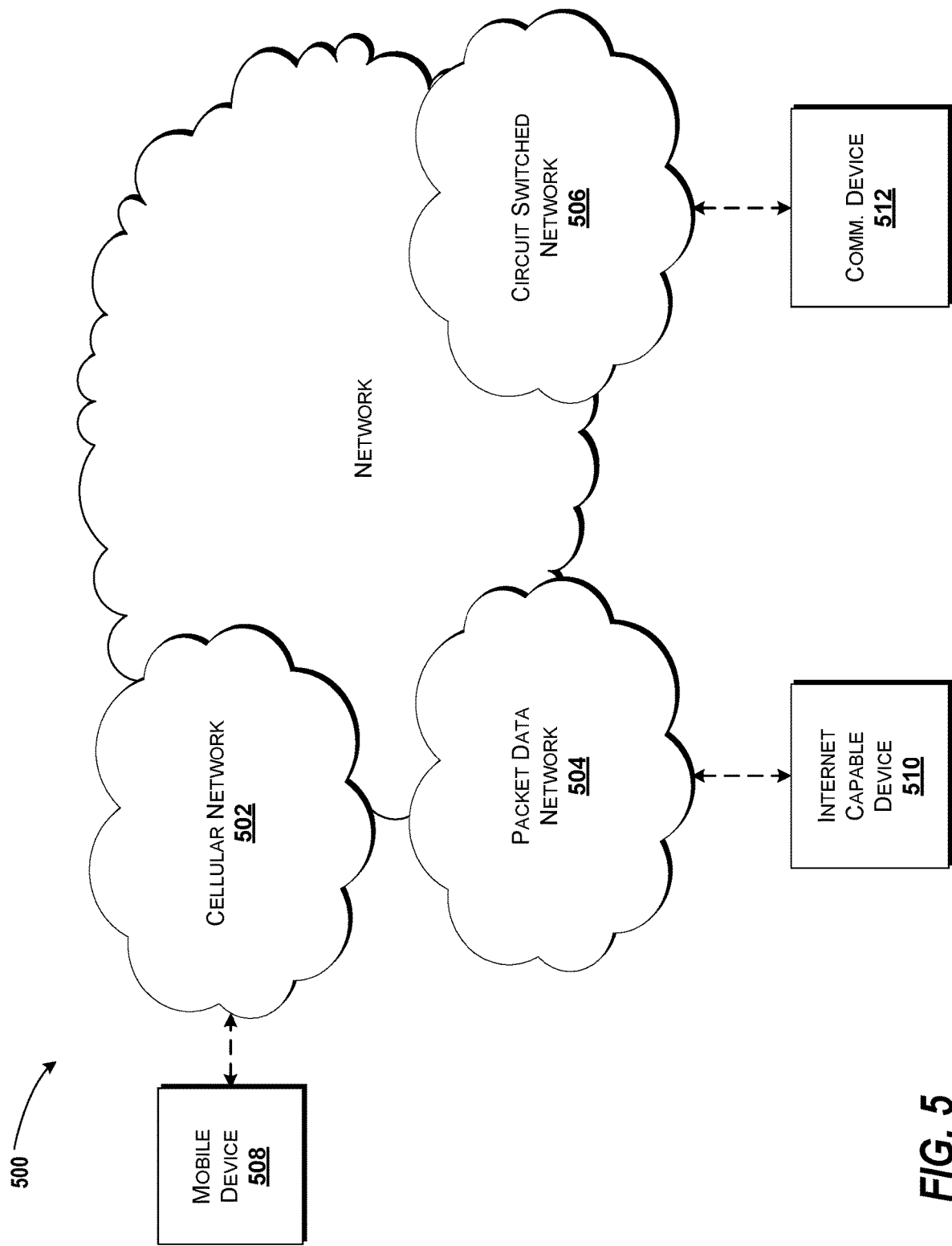
FIG. 5 is a diagram illustrating an example network capable of implementing aspects of the embodiments discussed herein.

Turning now to FIG. 5, a discussion of a network 500 is illustrated, according to an illustrative embodiment. The network 180 and/or the RAN 182 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G NR components, functions, applications, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems discussed with respect to FIG. 1, such as but not limited to the plurality of vehicles 102A-102N, the ITRUs 110A-110N, the UE 160, and/or the CID 170. In the specification, the network 180, the Ran 182, and/or the network 500 can refer broadly to, in some embodiments, any combination of the networks 502, 504, 506. It should be appreciated that substantially all of the functionality described with reference to the network 180, the RAN 182, and/or the network 500 can, in some embodiments, be performed by the cellular network 502, the packet data network 504, and/or the circuit switched network 506, alone or in combination with other networks, network elements, and the like.

Figure 6:
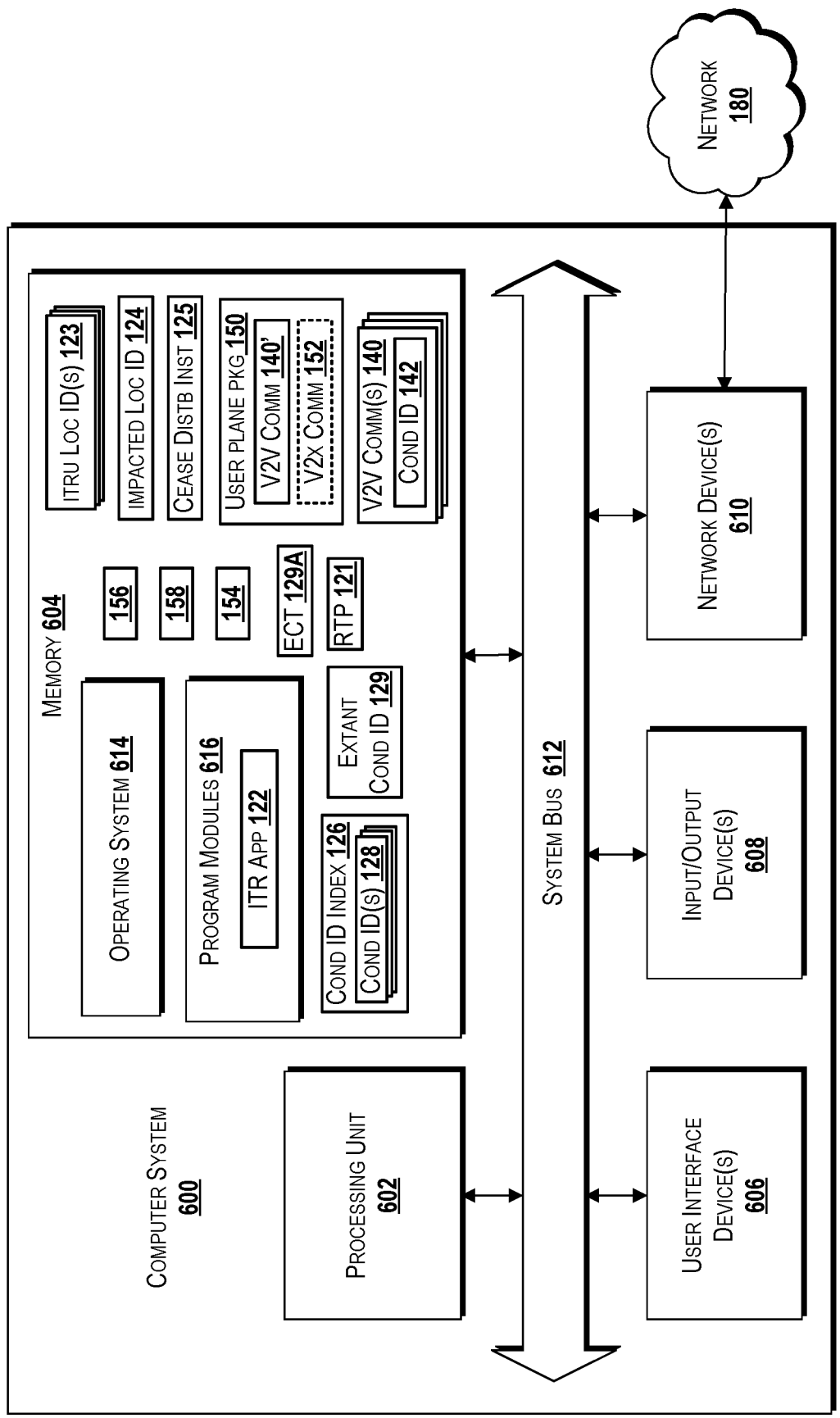
FIG. 6 is a block diagram illustrating an example computer system capable of implementing aspects of the embodiments presented and described herein.

FIG. 6 is a block diagram illustrating a computer system 600 can be configured to provide the functionality described herein related to V2X communications, in accordance with various embodiments of the concepts and technologies disclosed herein. In some embodiments, at least a portion of one or more of the plurality of vehicles 102A-102N, the ITRUs 110A-110N, and/or the CID 170 illustrated and described herein can be configured as and/or can have an architecture similar or identical to the computer system 600. In some embodiments, the UE 160 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 111 can be configured substantially similar to the processing unit 602. As such, one or more instances of the processing unit 602 can be implemented within one or more devices and/or components of the operating environment 100, such as but not limited to one or more of the plurality of vehicles 102A-102N, the ITRUs 110A-110N, the CID 170, and/or the UE 160. In some embodiments, the memory 120 can be configured substantially similar to the memory 604. As such, one or more instances of the memory 604 can be implemented within one or more devices and/or components of the operating environment 100, such as but not limited to one or more of the plurality of vehicles 102A-102N, the ITRUs 110A-110N, the CID 170, and/or the UE 160.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known to one of ordinary skill, the processors and processing units disclosed and discussed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include the ITR application 122, and/or other computer-readable instructions. These and/or other programs can be embodied in computer-readable media containing instructions that, when executed by the processing unit 602, perform one or more of the methods 300, 320, and 400 described in detail above with respect to FIGS. 3A, 3B, and 4. According to some embodiments, the program modules 616 may be embodied in hardware, software, firmware, or any combination thereof. It should be understood that the memory 604 also can be configured to store one or more instance of information and data discussed with respect to FIGS. 1, 2, 3A, 3B, and 4, such as but not limited to the retention time period 121, the ITRU location identifiers 123A-123N, the impacted location identifier 124, the cease distribution instruction 125, the condition identifier index 126, the plurality of condition identifiers 128, the extant condition identifier 129, the extant condition threshold 129A, the extant condition 129B, the direct communication range 130, the V2V communication 140, the condition identifier 142, the V2V communication 140', the user plane package 150, the V2X communication 152, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory", "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 180 and/or the RAN 182. Examples of the network devices 610 include, but are not limited to, a modem, a radio frequency ("RF") or infrared ("IR") transceiver, a telephonic interface, a bridge, a router, or a network card. The network 180 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 180 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). It should be understood that the examples provided are for illustration purposes only, and therefore should not be construed as limiting in any way.

Figure 7:
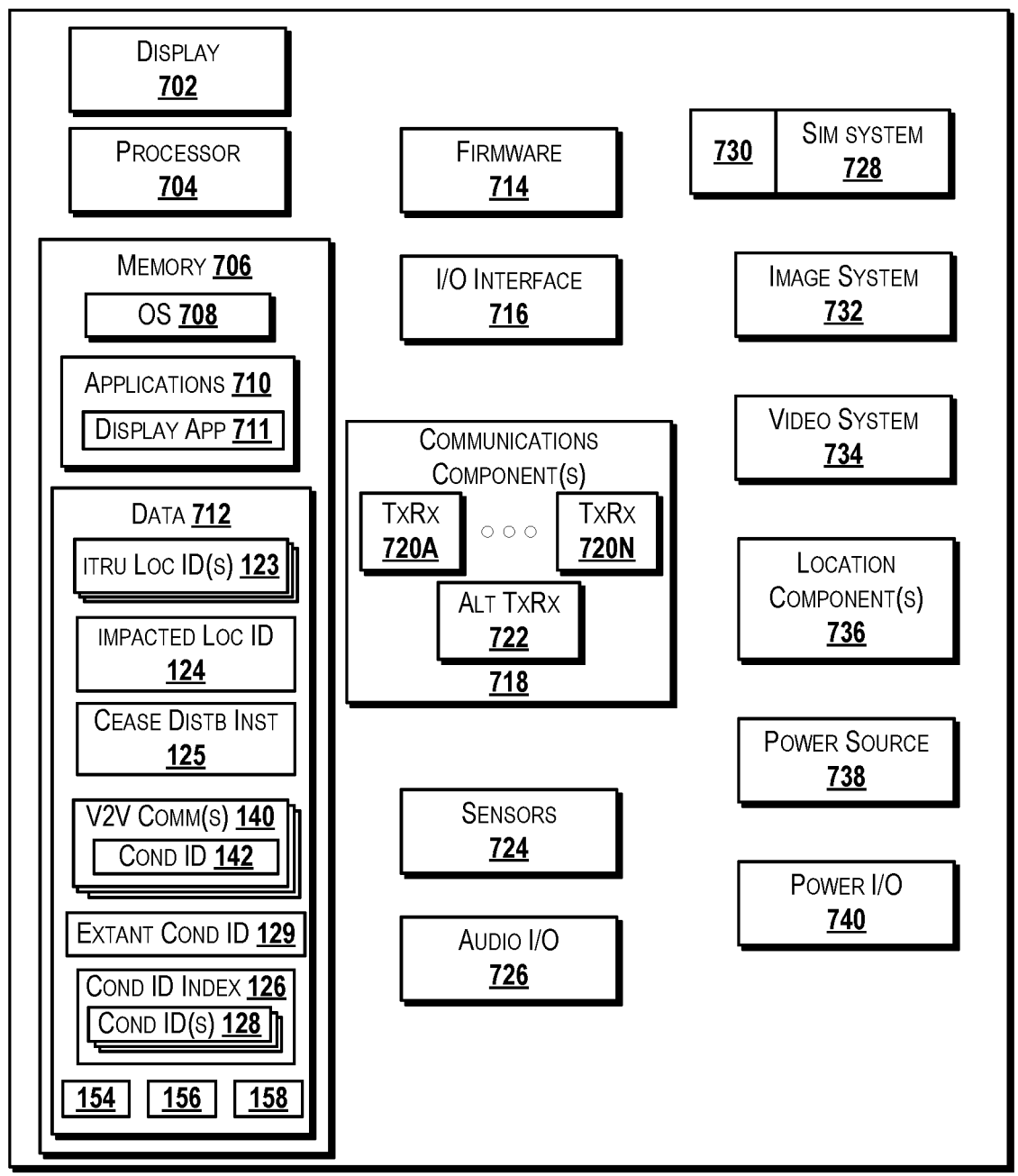
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the UE 160, the CID 170 and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a display application 711 that can present V2X communications, and/or other computer-executable instructions stored in a memory 706, or the like. In some embodiments, the applications 710 also can include a UI application (not illustrated in FIG. 7).

The UI application can interface with the operating system 708 to facilitate any of the operations discussed herein and functionality for presenting audiovisual content and/or data stored at the user equipment 700 and/or stored elsewhere. It is understood that one or more instances of the operating system 708 may be included and operate within one or more systems discussed with respect to the operating environment 100, such as but not limited to the UE 160, the CID 170. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in presenting content, presenting a V2X communication (e.g., any of the V2V communication 140', the V2N communication 154, the V2I communication 156, the V2P communication 158), providing feedback, presenting a condition identifier, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. According to various embodiments, the data 712 can include, for example, instances of the ITRU location identifiers 123A-123N, the impacted location identifier 124, the cease distribution instruction 125, the V2V communication 140, the condition identifier 142, the extant condition identifier 129, the condition identifier index 126, the plurality of condition identifiers 128, the V2X communication 152, the V2N communication 154, the V2I communication 156, the V2P communication 158, any other elements discussed with respect to FIG. 1 and FIG. 2, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1 (e.g., the UE 160). The I/O interface 716 can be configured to support the input/output of data such as a V2X communication, the user plane package 150, (and/or any data that can be included therein such as but not limited to the V2V communication 140'), and/or any other information or elements discussed with respect to FIGS. 1, 2, 3A, 3B, and 4, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks such as the network 180 and/or the RAN 182 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support the network transmission mode 107 over a Uu interface and/or the direct transmission mode 106 over a PC5 interface.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 may be included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to an integrated telecommunications roadside unit for supporting V2X communications have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:
1. An integrated telecommunications roadside unit comprising:
 a processor; and
 a memory that stores computer-executable instructions that, in response to execution by the processor, cause the processor to perform operations comprising:
  intercepting a vehicle-to-vehicle communication that is provided from a first vehicle to a second vehicle, wherein the first vehicle, the second vehicle, and the integrated telecommunications roadside unit are within a direct communication range,
  determining that the vehicle-to-vehicle communication was transmitted by the first vehicle via a direct transmission mode, wherein the direct transmission mode indicates that the vehicle-to-vehicle communication is configured for transmission without traversing a network,
  generating a user plane package that conforms with a network access protocol of the network,
  encapsulating the vehicle-to-vehicle communication in the user plane package, and
  routing, by a network access transceiver of the integrated telecommunications roadside unit via the network, the user plane package encapsulating the vehicle-to-vehicle communication to a destination network access node, wherein the destination network access node is outside of the direct communication range.

2. The integrated telecommunications roadside unit of claim 1, wherein the vehicle-to-vehicle communication is provided from the first vehicle to the second vehicle via a vehicle communication interface that uses the direct transmission mode.

3. The integrated telecommunications roadside unit of claim 1, wherein the user plane package is configured to instruct the destination network access node to decapsulate the vehicle-to-vehicle communication from the user plane package such that the vehicle-to-vehicle communication remains intact.

4. The integrated telecommunications roadside unit of claim 1, wherein the user plane package is configured to instruct the destination network access node to provide the vehicle-to-vehicle communication to a third vehicle.

5. The integrated telecommunications roadside unit of claim 4, wherein the vehicle-to-vehicle communication is provided to the third vehicle via a vehicle communication interface that uses the direct transmission mode.

6. The integrated telecommunications roadside unit of claim 4, wherein the user plane package is configured to instruct the destination network access node to generate a vehicle-to-network communication based on the vehicle-to-vehicle communication.

7. The integrated telecommunications roadside unit of claim 6, wherein the user plane package is configured to instruct the destination network access node to provide the vehicle-to-network communication to one or more user equipment, wherein the vehicle-to-network communication is provided from the destination network access node to the one or more user equipment over a network communication interface that uses a network transmission mode.

8. A method comprising:
intercepting, by an integrated telecommunications roadside unit comprising a processor, a vehicle-to-vehicle communication that is provided from a first vehicle to a second vehicle, wherein the first vehicle, the second vehicle, and the integrated telecommunications roadside unit are within a direct communication range;
determining, by the integrated telecommunications roadside unit, that the vehicle-to-vehicle communication was transmitted by the first vehicle via a direct transmission mode, wherein the direct transmission mode indicates that the vehicle-to-vehicle communication is configured for transmission without traversing a network;
generating, by the integrated telecommunications roadside unit, a user plane package that conforms with a network access protocol of the network;
encapsulating, by the integrated telecommunications roadside unit, the vehicle-to-vehicle communication in the user plane package; and
routing, by a network access transceiver of the integrated telecommunications roadside unit via the network, the user plane package encapsulating the vehicle-to-vehicle communication to a destination network access node, wherein the destination network access node is outside of the direct communication range.

9. The method of claim 8, wherein the vehicle-to-vehicle communication is provided from the first vehicle to the second vehicle via a vehicle communication interface that uses the direct transmission mode.

10. The method of claim 8, wherein the user plane package is configured to instruct the destination network access node to decapsulate the vehicle-to-vehicle communication from the user plane package such that the vehicle-to-vehicle communication remains intact.

11. The method of claim 8, wherein the user plane package is configured to instruct the destination network access node to provide the vehicle-to-vehicle communication to a third vehicle.

12. The method of claim 11, wherein the vehicle-to-vehicle communication is provided to the third vehicle via a vehicle communication interface that uses the direct transmission mode.

13. The method of claim 11, wherein the user plane package is configured to instruct the destination network access node to generate a vehicle-to-network communication based on the vehicle-to-vehicle communication.

14. The method of claim 13, wherein the user plane package is configured to instruct the destination network access node to provide the vehicle-to-network communication to one or more user equipment, wherein the vehicle-to-network communication is provided from the destination network access node to the one or more user equipment over a network communication interface that uses a network transmission mode.

15. A computer storage medium having computer-executable instructions stored thereon that, in response to execution by a processor of an integrated telecommunications roadside unit, causes the processor to perform operations comprising:
intercepting a vehicle-to-vehicle communication that is provided from a first vehicle to a second vehicle, wherein the first vehicle, the second vehicle, and the integrated telecommunications roadside unit are within a direct communication range;
determining that the vehicle-to-vehicle communication was transmitted by the first vehicle via a direct transmission mode, wherein the direct transmission mode indicates that the vehicle-to-vehicle communication is configured for transmission without traversing a network;
generating a user plane package that conforms with a network access protocol of the network;
encapsulating the vehicle-to-vehicle communication in the user plane package; and
routing, by a network access transceiver of the integrated telecommunications roadside unit via the network, the user plane package encapsulating the vehicle-to-vehicle communication to a destination network access node, wherein the destination network access node is outside of the direct communication range.

16. The computer storage medium of claim 15, wherein the vehicle-to-vehicle communication is provided from the first vehicle to the second vehicle via a vehicle communication interface that uses the direct transmission mode.

17. The computer storage medium of claim 15, wherein the user plane package is configured to
instruct the destination network access node to decapsulate the vehicle-to-vehicle communication from the user plane package such that the vehicle-to-vehicle communication remains intact, and
instruct the destination network access node to provide the vehicle-to-vehicle communication to a third vehicle.

18. The computer storage medium of claim 15, wherein the user plane package is configured to instruct the destination network access node to generate a vehicle-to-network communication based on the vehicle-to-vehicle communication.

19. The computer storage medium of claim 18, wherein the vehicle-to-vehicle communication is provided to a third vehicle via a vehicle communication interface that uses the direct transmission mode.

20. The computer storage medium of claim 18, wherein the user plane package is configured to instruct the destination network access node to provide the vehicle-to-network communication to one or more user equipment, wherein the vehicle-to-network communication is provided from the destination network access node to the one or more user equipment over a network communication interface that uses a network transmission mode.

* * * * *